(12) United States Patent
Jeon et al.

(10) Patent No.: US 11,130,320 B2
(45) Date of Patent: Sep. 28, 2021

(54) TRANSPARENT POLYMER FILM AND ELECTRONIC DEVICE INCLUDING THE SAME

(71) Applicant: SAMSUNG ELECTRONICS CO., LTD., Suwon-si (KR)

(72) Inventors: Hyun Jeong Jeon, Seoul (KR); Min Sang Kim, Anseong-si (KR); Yoon Seok Ko, Seoul (KR); Byung Hee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 753 days.

(21) Appl. No.: 14/797,517

(22) Filed: Jul. 13, 2015

(65) Prior Publication Data

US 2016/0009862 A1    Jan. 14, 2016

(30) Foreign Application Priority Data

Jul. 11, 2014  (KR) .......................... 10-2014-0087794
Jul. 10, 2015  (KR) .......................... 10-2015-0098080

(51) Int. Cl.
*B32B 27/28* (2006.01)
*C08G 73/22* (2006.01)
(Continued)

(52) U.S. Cl.
CPC ........ *B32B 27/281* (2013.01); *C08G 73/1042* (2013.01); *C08G 73/22* (2013.01);
(Continued)

(58) Field of Classification Search
CPC . B32B 27/281; B32B 2457/00; C09D 179/08; C08G 73/22; C08G 73/1042;
(Continued)

(56) References Cited

U.S. PATENT DOCUMENTS 3,356,858 A * 12/1967 Wanlass .............. H01L 27/0927
                                                    257/369
4,980,447 A    12/1990 Khanna
(Continued)

FOREIGN PATENT DOCUMENTS

JP    11-236450 A    8/1999
JP    2006206756 A   8/2006
(Continued)

OTHER PUBLICATIONS

Office Action dated Mar. 29, 2018, issued for the corresponding Chinese Patent Application No. 201510409015.8, with English Translation.
(Continued)

*Primary Examiner* — John D Freeman
(74) *Attorney, Agent, or Firm* — Cantor Colburn LLP

(57) ABSTRACT

A film including a polyimide-polybenzoxazole copolymer including a repeating unit represented by Chemical Formula 1:

Chemical Formula 1

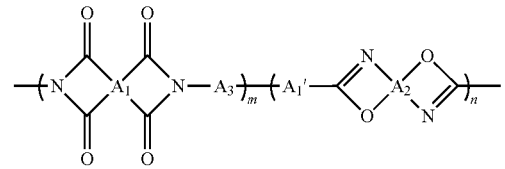

wherein in Chemical Formula 1, $A_1$, $A_1'$, $A_2$, $A_3$, m, and n are the same as described in the specification.

15 Claims, 3 Drawing Sheets

(51) Int. Cl.
*C08G 73/10* (2006.01)
*C09D 179/08* (2006.01)

(52) U.S. Cl.
CPC ........ *C09D 179/08* (2013.01); *B32B 2457/00* (2013.01); *Y10T 428/31721* (2015.04)

(58) Field of Classification Search
CPC ......... C08G 73/1007; Y10T 428/31721; C08L 2203/16; C08L 79/08; C08L 2203/206; C08L 2203/204; C08J 5/18; C08J 2379/08

See application file for complete search history.

(56) References Cited

U.S. PATENT DOCUMENTS

| | | | |
|---|---|---|---|
| 5,071,997 A * | 12/1991 | Harris | B01D 71/64 428/395 |
| 7,629,091 B2 | 12/2009 | Ishii et al. | |
| 2004/0197526 A1 * | 10/2004 | Mehta | B81C 1/00158 428/156 |
| 2006/0017154 A1 * | 1/2006 | Eguchi | H01L 27/1214 257/701 |
| 2009/0226642 A1 * | 9/2009 | Simone | G02F 1/133719 428/1.33 |
| 2011/0065823 A1 | 3/2011 | Lee et al. | |
| 2012/0305484 A1 * | 12/2012 | Freeman | B01D 71/62 210/640 |
| 2013/0189623 A1 * | 7/2013 | Kim | G03F 7/004 430/270.1 |
| 2014/0316074 A1 * | 10/2014 | Park | C08G 73/1067 525/435 |
| 2015/0094500 A1 * | 4/2015 | Liu | B01D 71/40 568/917 |
| 2016/0194542 A1 * | 7/2016 | Sekine | C08G 73/1064 361/688 |

FOREIGN PATENT DOCUMENTS

| | | |
|---|---|---|
| JP | 2008038031 A | 2/2008 |
| WO | 2006080119 A1 | 8/2006 |
| WO | 2009-107889 A1 | 9/2009 |
| WO | WO-2014003211 A1 * | 1/2014 ........... C09D 179/08 |

OTHER PUBLICATIONS

Junichi Ishii, et al., "Organo-Soluble Low CTE Polyimides and their Applications to Photsensitive Cover Layer Materials in Flexible Printed Circuit Boards", High Performance Polymers, 2009, 21: 123-138.

Junichi Ishii, et al., "Organo-soluble Polyimides and Their Applications to Photosensitive Cover Layer Materials in Flexible Printed Circuit Boards", Journal of Photopolymer Science and Technology, vol. 21, No. 1 (2008), 107-112.

* cited by examiner

TRANSPARENT POLYMER FILM AND ELECTRONIC DEVICE INCLUDING THE SAME

CROSS-REFERENCE TO RELATED APPLICATION

This application claims priority to and the benefit of Korean Patent Application Nos. 10-2014-0087794 and 10-2015-0098080 filed in the Korean Intellectual Property Office on Jul. 11, 2014, and Jul. 10, 2015, the entire contents of which are incorporated herein by reference.

BACKGROUND

1. Field

A transparent polymer film and an electronic device including the same are disclosed.

2. Description of the Related Art

Recently, the need for a portable, flexible, electrically economical display, which is ultra light in weight, has been growing increasingly as a display device for visualizing various kinds of information becomes more and more popular. In order to fabricate the flexible display, a flexible substrate, organic and inorganic materials that need to be processed at a low temperature, flexible electronics, encapsulation, packaging technology, and the like are required. Among these, the flexible substrate may have a substantial influence on the performance, reliability, and price of the flexible display. On the other hand, a flexible protective film having high transparency is required in an electronic device such as a light emitting diode or a complementary metal oxide film semiconductor sensor.

Various polymer films have been suggested for the flexible substrate or the flexible protective film. Polymers are a light weight material that may be relatively easily transformed into a film. However, polymers they generally have poor thermal stability (e.g., a high coefficient of thermal expansion). Therefore, in order to have utility as a protective film for an electronic device or as a flexible substrate, it is desired that the polymers have improved thermal properties and enhanced optical properties (e.g., high transparency and a low yellow index).

Thus, there remains a need in a new polymeric material having improved thermal and optical properties.

SUMMARY

An embodiment provides a polymer transparent film having improved thermal and optical properties.

Another embodiment provides a method of manufacturing the polymer transparent film.

Yet another embodiment provides an electronic device including the polymer transparent film.

In an embodiment, a transparent film includes a polyimide-polybenzoxazole copolymer including a repeating unit represented by Chemical Formula 1:

Chemical Formula 1

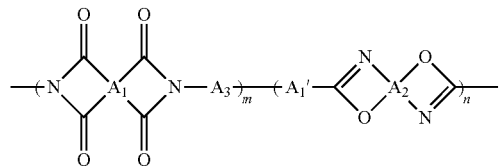

wherein in Chemical Formula 1, $A_1$ is independently a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $A_1'$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $A_2$ is a substituted or unsubstituted tetravalent C6 to C30 aromatic organic group, $A_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and m and n are real numbers indicating a mole ratio of an imide repeating unit and a benzoxazole repeating unit, provided that a ratio of n to m is greater than about 0 and less than about 0.01.

The ratio of n/m may be greater than 0.0005 and less than or equal to 0.006.

The ratio of n/m may be greater than or equal to 0.001 and less than or equal to 0.005.

$A_1$ may be selected from chemical formulae:

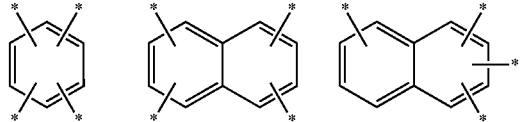

-continued

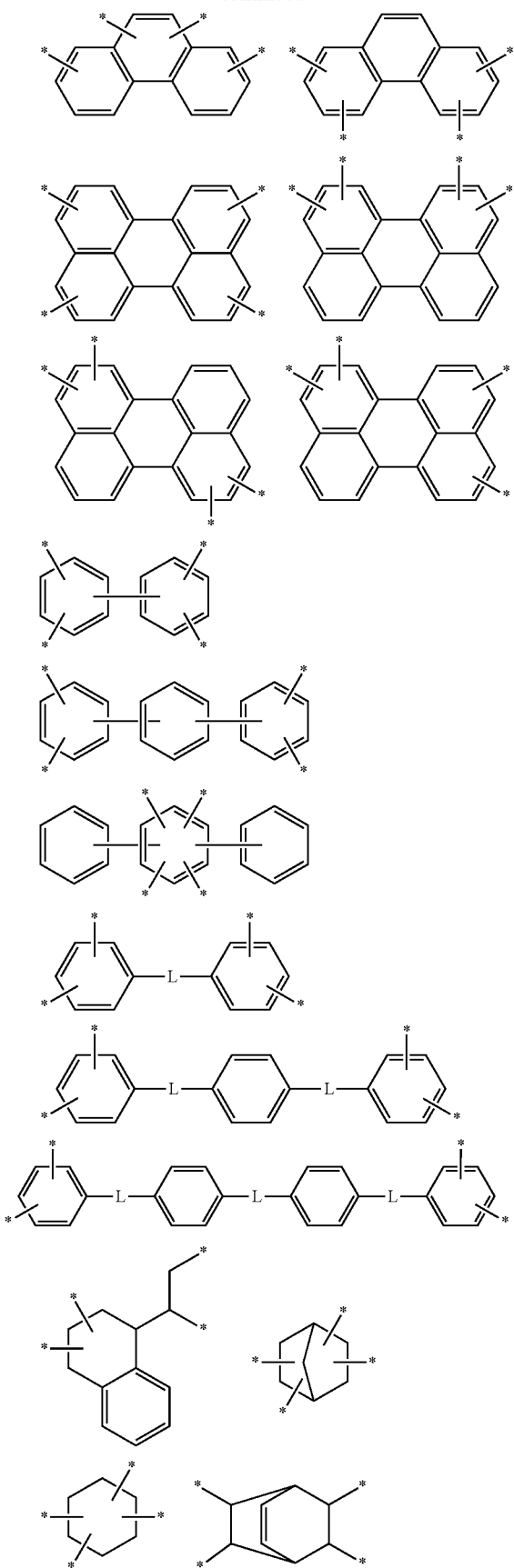

-continued

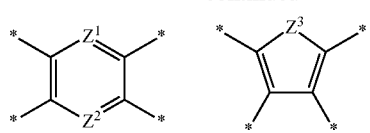

wherein in the chemical formulae, each residual group may be substituted or unsubstituted, each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $Z^1$ and $Z^2$ are the same or different and are independently —N= or —C(R$^{100}$)= wherein R$^{100}$ is hydrogen or a C1 to C5 alkyl group, provided that $Z^1$ and $Z^2$ are not simultaneously —C(R$^{100}$)=, $Z^3$ is —O—, —S—, or —NR$^{101}$—, wherein R$^{101}$ is hydrogen or a C1 to C5 alkyl group, and

* is a point where the residual group is linked to a neighboring atom.

For example, A$_1$ may be selected from chemical formulae:

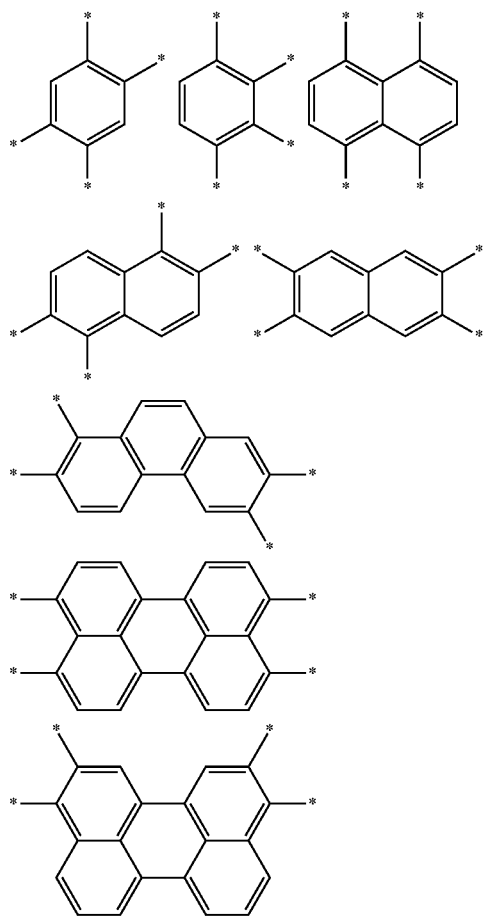

-continued
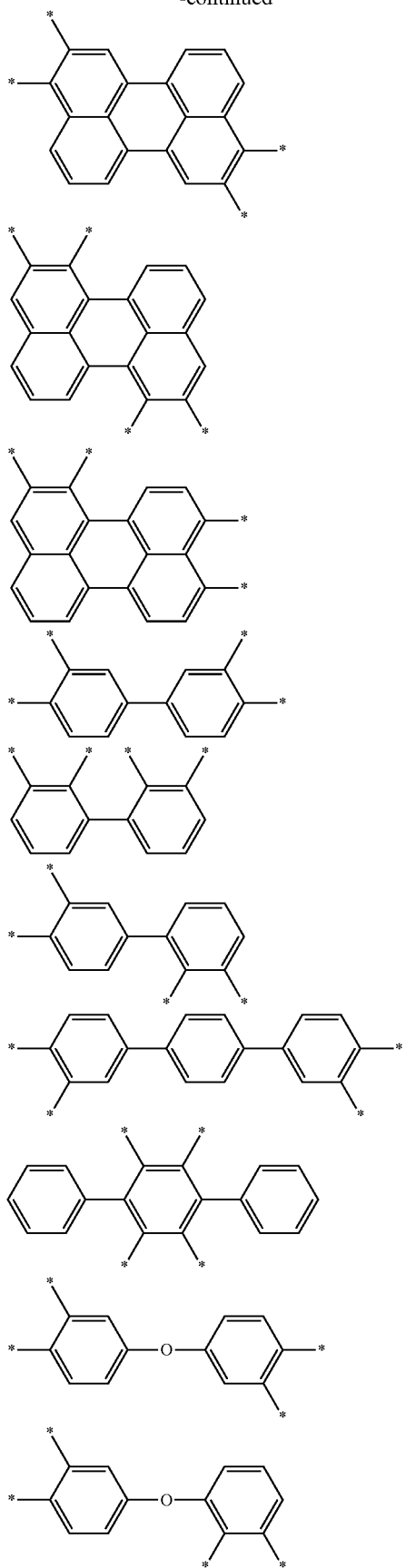
-continued
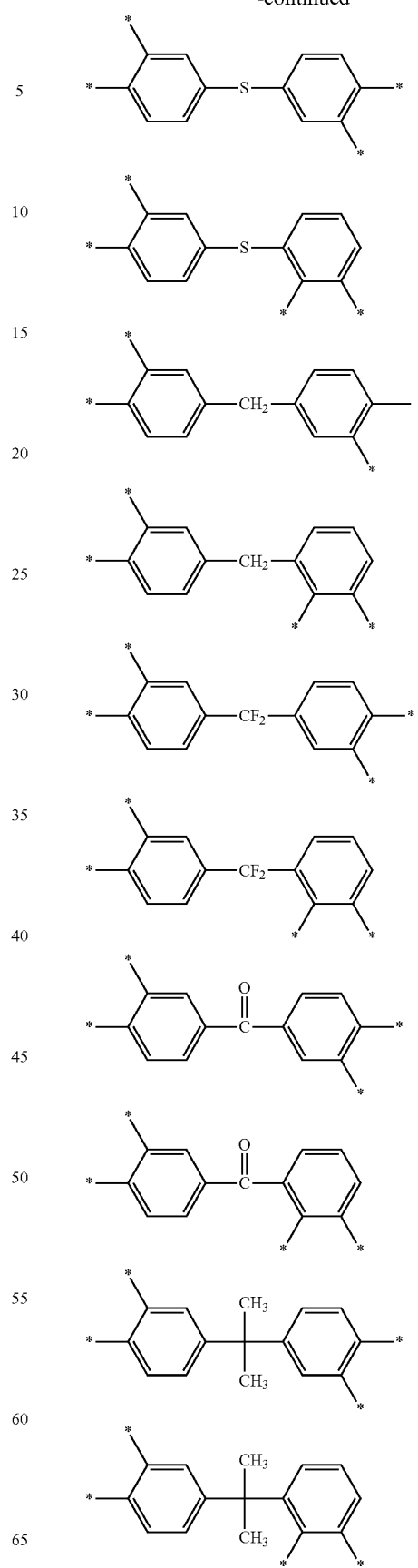

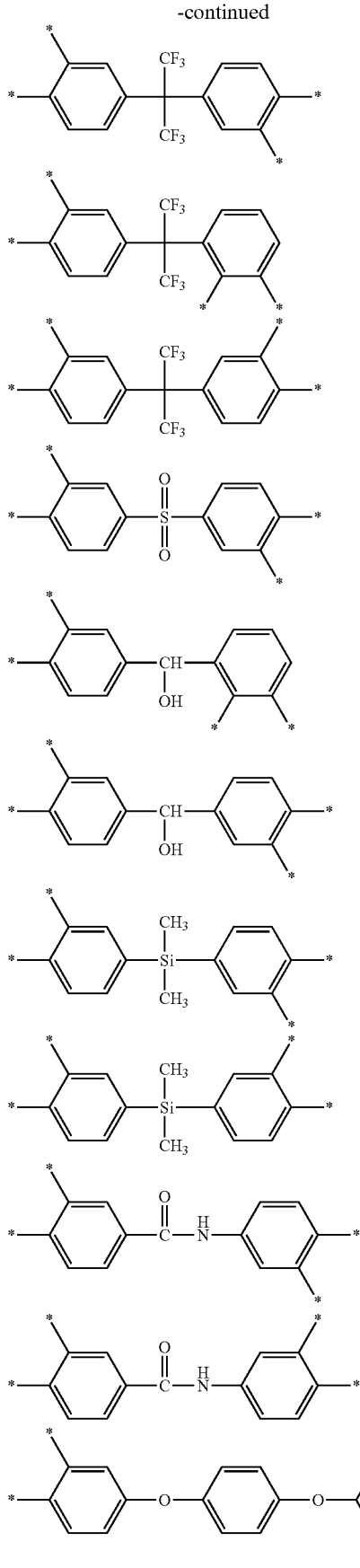
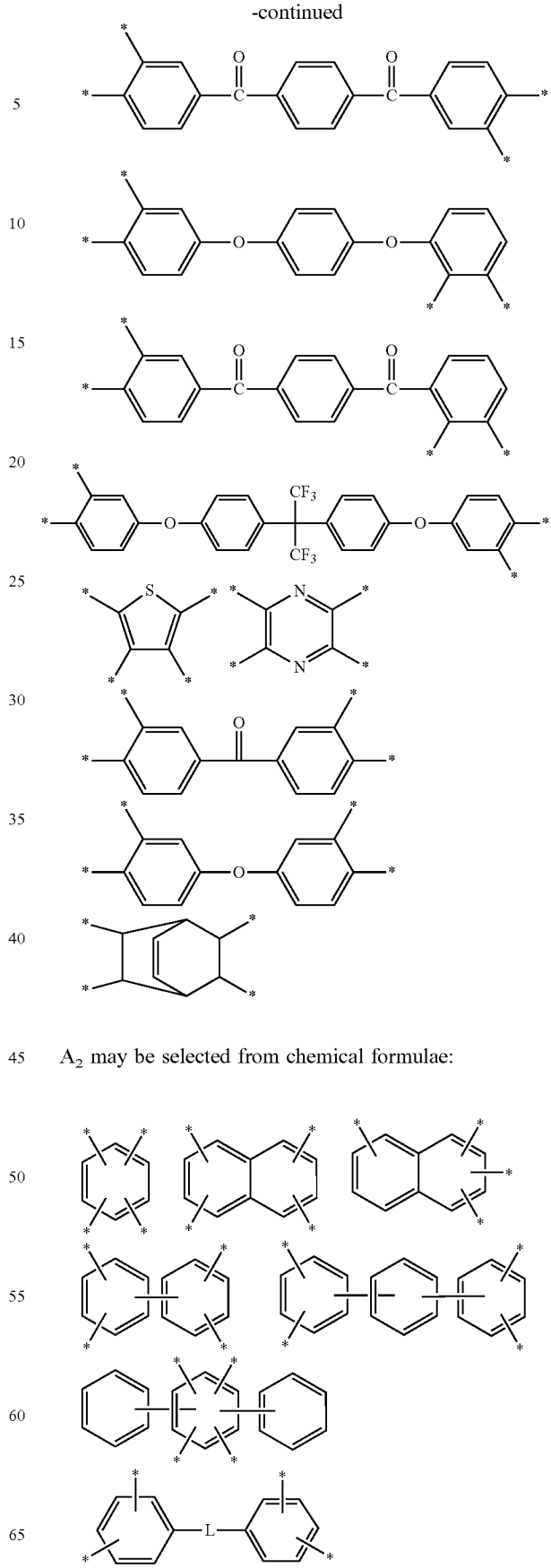
$A_2$ may be selected from chemical formulae:
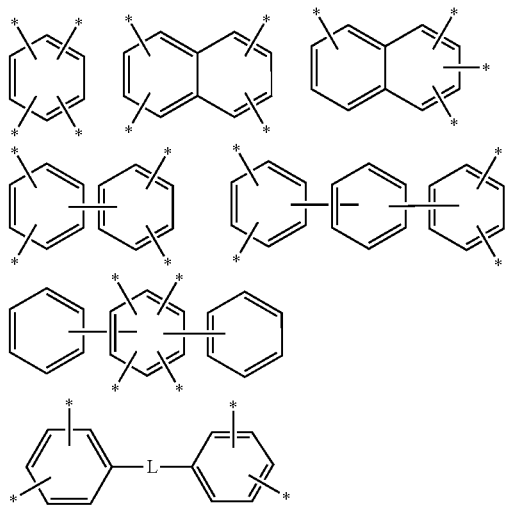

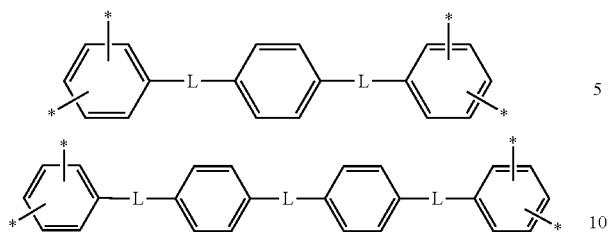

wherein in the chemical formulae, each residual aromatic group is substituted or unsubstituted,

* is a point where the residual group is linked to a neighboring atom, and each L is the same or different from each other, and is independently a direct bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and

* is a point where the residual aromatic group is linked to a neighboring atom.

For example, A$_2$ may be selected from chemical formulae:

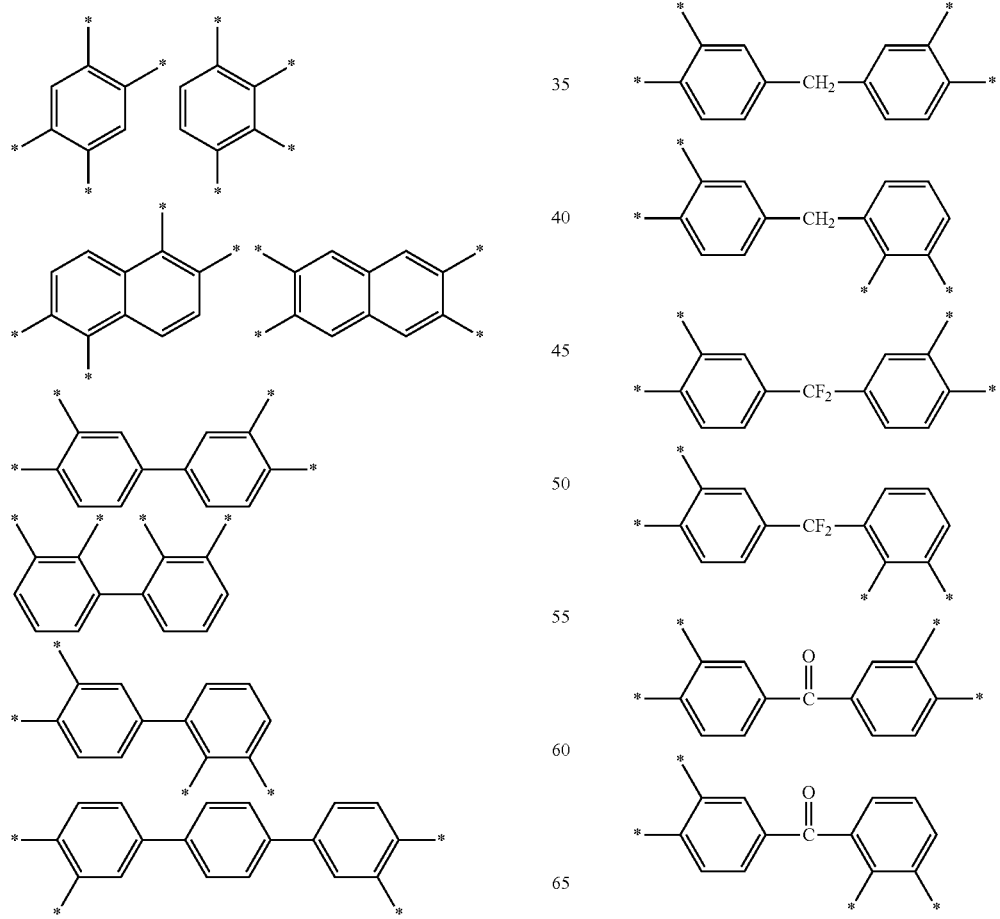

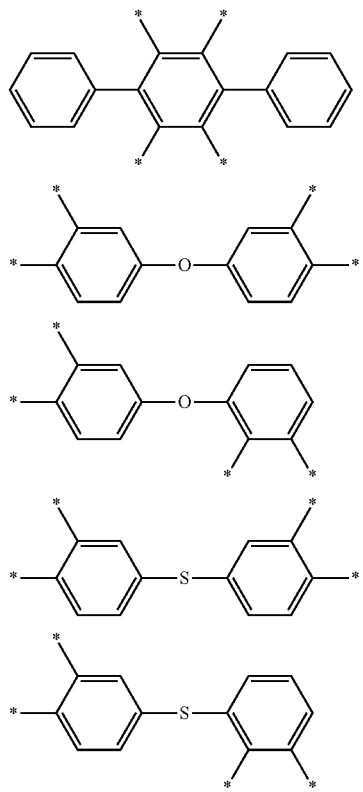

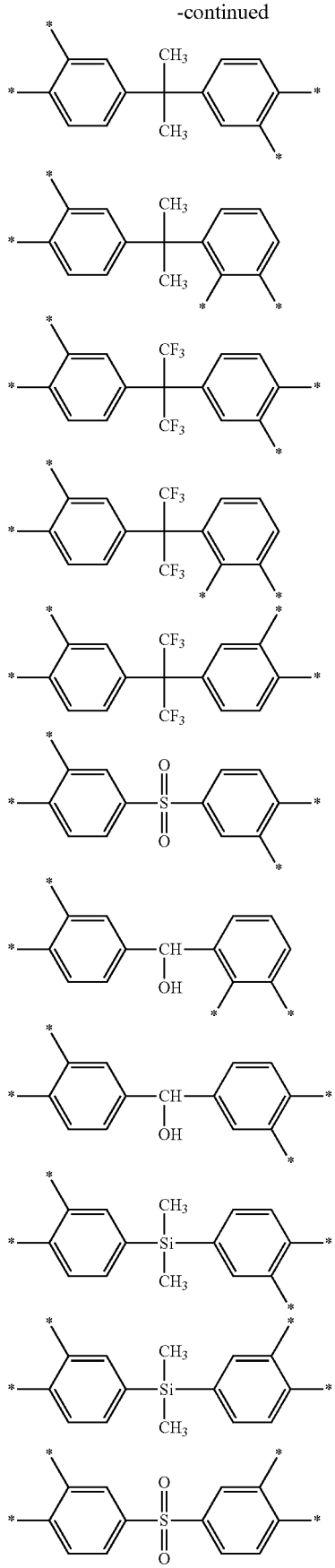
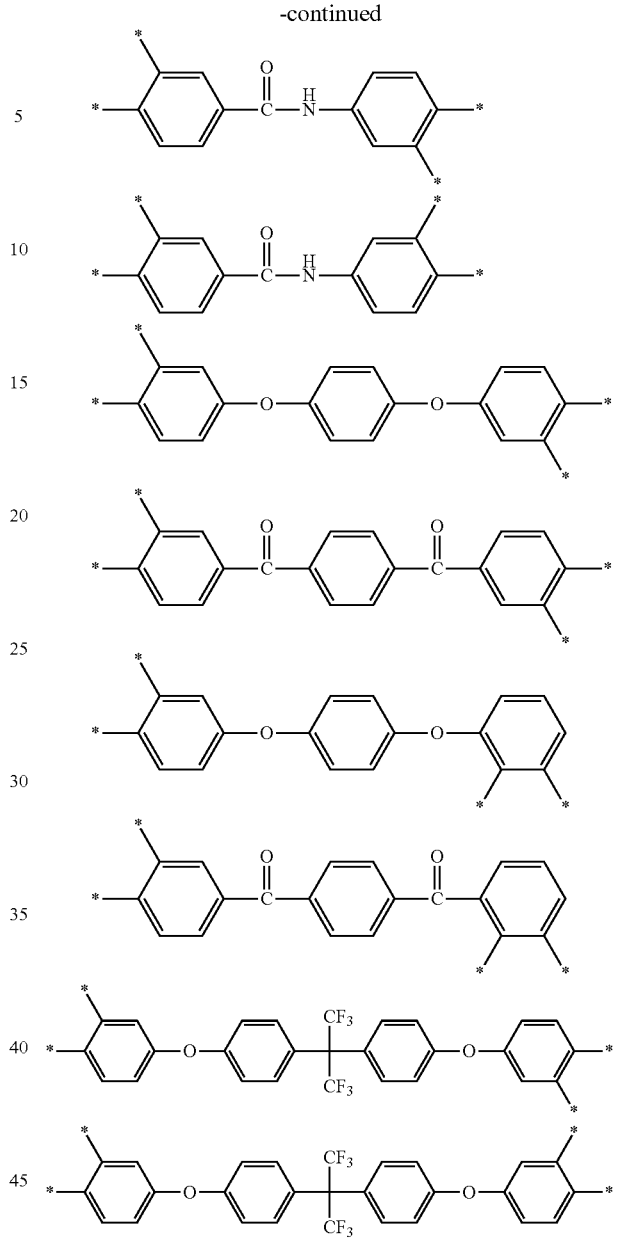
$A_3$ may be selected from chemical formulae:
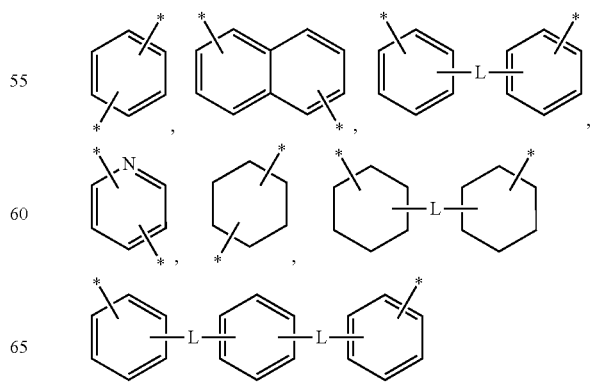

-continued

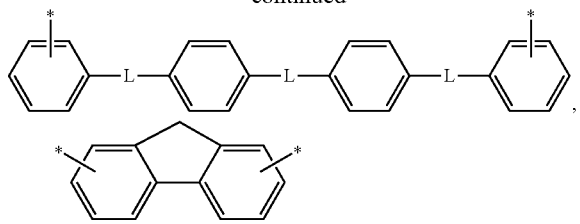

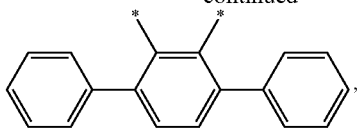

In the chemical formulae, each residual group is substituted or unsubstituted, each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and

* is a point where the residual group is linked to a neighboring atom.

For example, A$_3$ may be selected from chemical formulae:

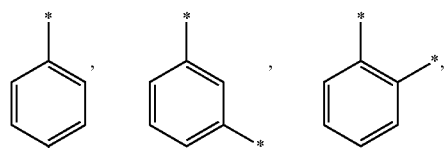

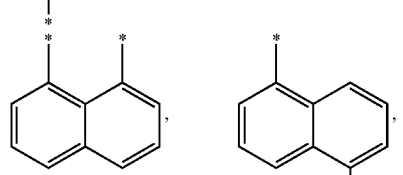

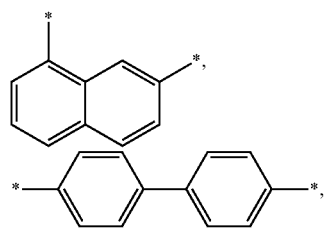

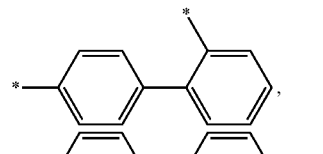

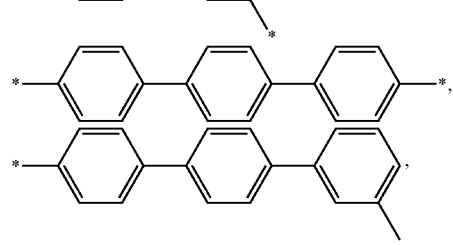

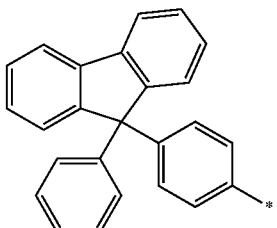

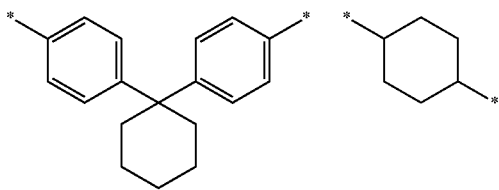

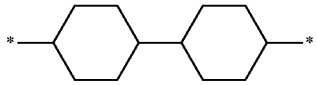

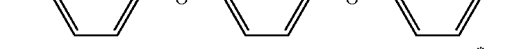

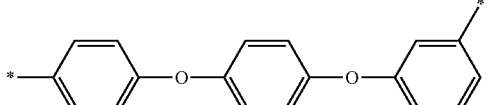

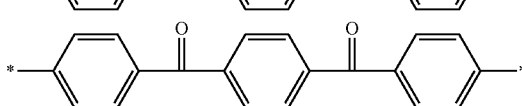

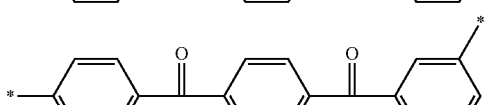

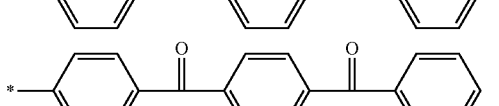

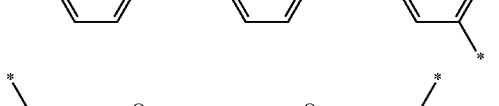

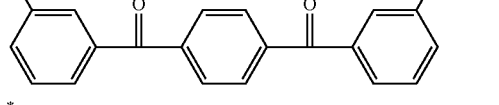

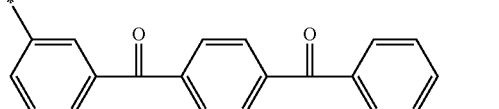

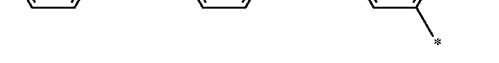

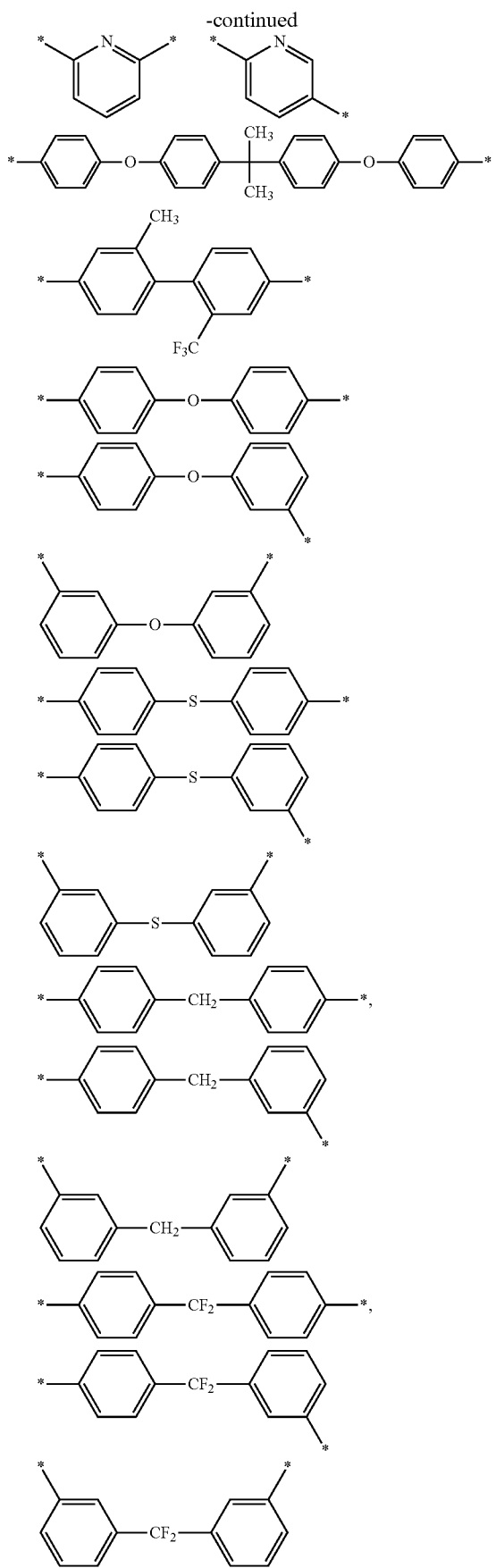
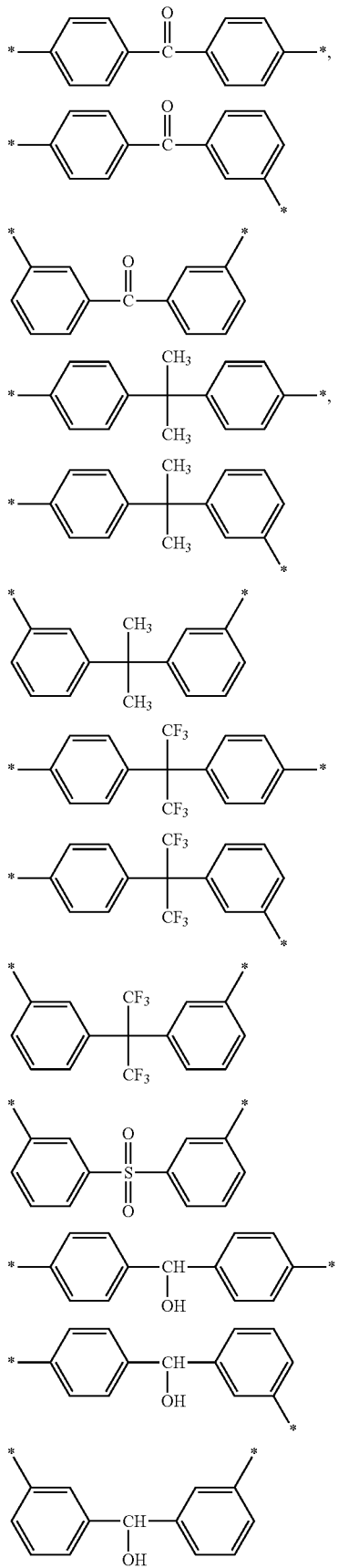

-continued

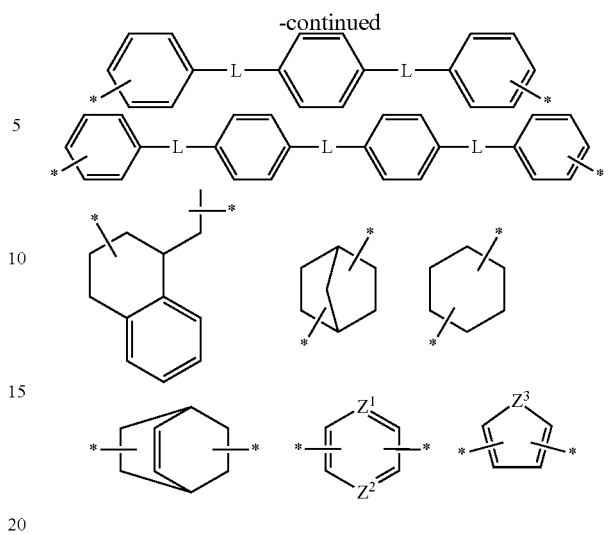

$A_1'$ is selected from chemical formulae:

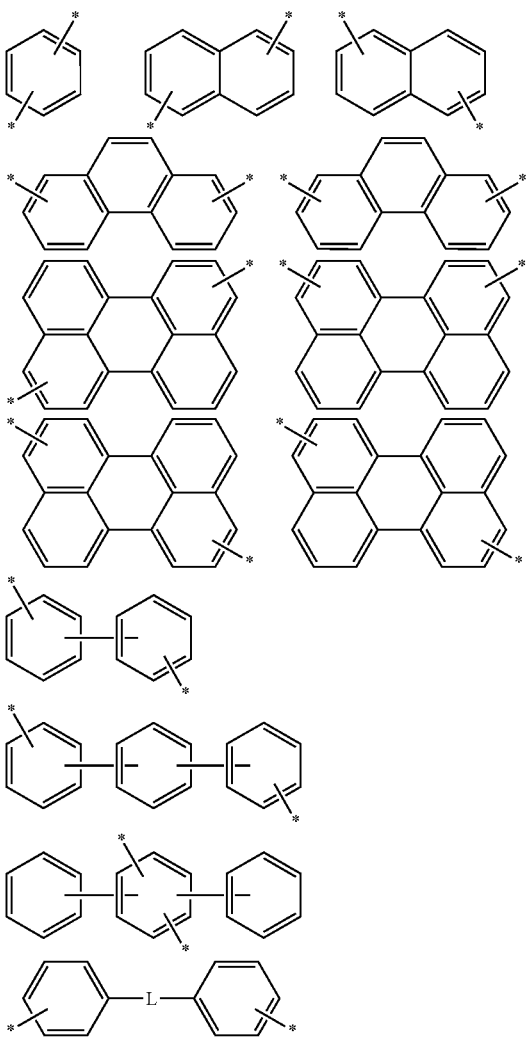

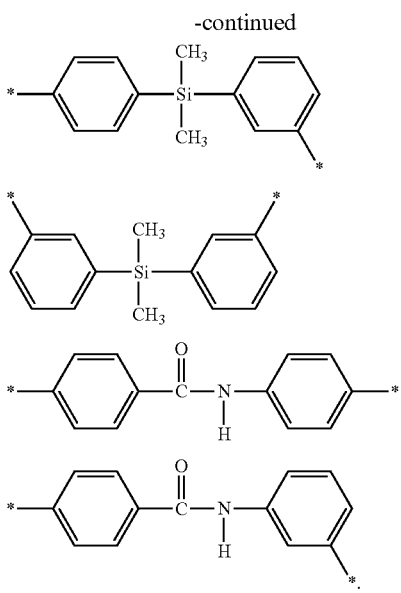

wherein in the chemical formulae,
each residual group is substituted or unsubstituted,
each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,
$Z^1$ and $Z^2$ are the same or different and are independently —N= or —C(R$^{100}$)= wherein R$^{100}$ is hydrogen or a C1 to C5 alkyl group, provided that $Z^1$ and $Z^2$ are not simultaneously —C(R$^{100}$)=,
$Z^3$ is —O—, —S—, or —NR$^{101}$—, wherein R$^{101}$ is hydrogen or a C1 to C5 alkyl group, and
* is a point where the residual group is linked to a neighboring atom.

The film may have transmittance of greater than or equal to about 85% for light at a wavelength of about 300 nanometers to about 800 nanometers.

The film may have a yellow index of less than or equal to about 5.2.

The film may have a coefficient of thermal expansion of less than or equal to about 12 parts per million/° C. at a temperature of about 50 to about 300° C.

The film may include a deposition film formed on the surface of the film, and the deposition film may include a silicon oxide, a polysilicic acid, an alkali metal silicate, an alkaline-earth metal silicate, an aluminosilicate, a silicon nitride, a silicon oxynitride, a silicon carbide, a silicon aluminaoxynitride, or a combination thereof.

In another embodiment, an electronic device includes:
a substrate;
the film formed on the substrate; and
a deposition film formed on the film,
wherein the deposition film includes a silicon oxide, a polysilicic acid, an alkali metal silicate, an alkaline-earth metal silicate, an aluminosilicate, a silicon nitride, a silicon oxynitride, a silicon carbide, a silicon aluminaoxynitride, or a combination thereof.

The deposition film may have surface roughness of about 1 nanometer to about 100 nanometers.

In yet another embodiment, a method of manufacturing a transparent film including a polyimide-polybenzoxazole copolymer including a repeating unit represented by Chemical Formula 1 includes:

obtaining a composition including a polyamic acid copolymer represented by Chemical Formula 5 which is a condensation polymerization product of a tetracarboxylic dianhydride compound represented by Chemical Formula 2; a diamine compound represented by Chemical Formula 3; and a hydroxy diamine compound represented by Chemical Formula 4;

imidizing the composition including the polyamic acid copolymer to obtain a film including a polyimide copolymer represented by Chemical Formula 6; and heat-treating the film to obtain a transparent film including a polyimide-polybenzoxazole copolymer including a repeating unit represented by Chemical Formula 1:

Chemical Formula 1

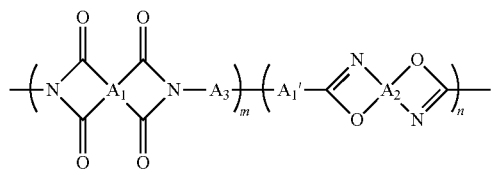

Chemical Formula 2

Chemical Formula 3

NH$_2$—A$_3$—NH$_2$

Chemical Formula 4

NH$_2$—A$_2$'—NH$_2$

Chemical Formula 5

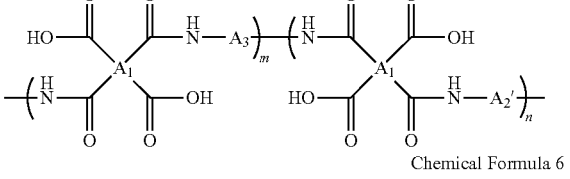

Chemical Formula 6

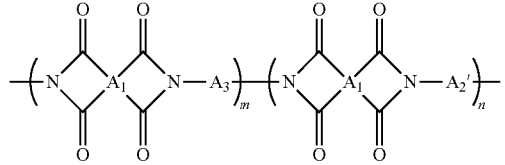

wherein in Chemical Formulae 1 to 6, each A$_1$ is the same as or different from each other, and is independently a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, A$_2$' is a hydroxy-containing group selected from chemical formulae,

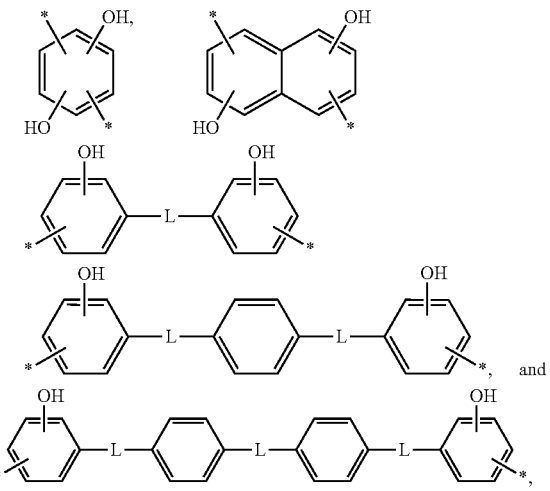

wherein in the chemical formulae, each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,

* is a point where the residual group is linked to a neighboring atom, and the —OH substituent in each residual group is located at the ortho position to the point where the residual group is linked to a neighboring atom, A$_2$ is selected from chemical formulae,

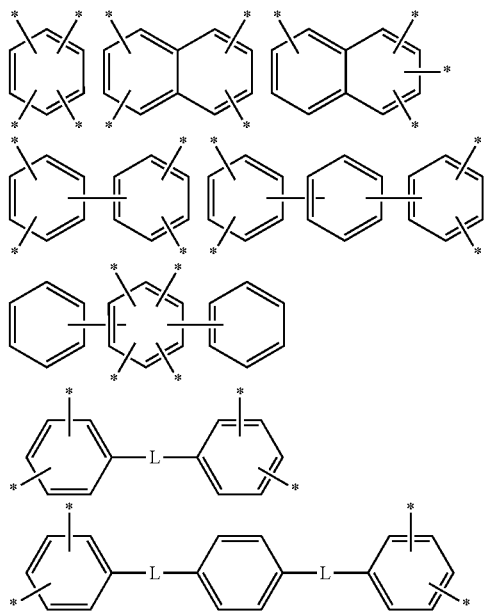

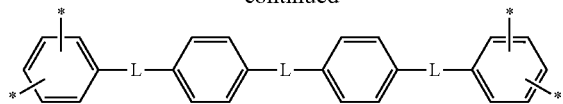

wherein in the chemical formulae, each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and

* is a point where they are linked to a neighboring atom,

A$_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, m and n are real numbers indicating a mole ratio of an imide repeating unit and a benzoxazole repeating unit, provided that a ratio of n to m is greater than about 0 and less than about 0.01.

The tetracarboxylic dianhydride compound represented by Chemical Formula 2 may include one or more selected from 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-biphenyl tetracarboxylic dianhydride; 4,4'-bis(3,4-dicarboxyphenoxy)biphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxyphenoxy) diphenylsulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxyphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxyphenoxy) phenyl]propane dianhydride; 2,2-bis[4-(3,4-dicarboxyphenoxy)phenyl]propane dianhydride; 2,2-[4-(2,3-dicarboxyphenoxy)-4'-(3,4-dicarboxyphenoxy) diphenyl]-propane dianhydride; 2,2-bis[4-(3,4-dicarboxylphenoxy-3,5-dimethyl) phenyl]propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy)phenyl]hexafluoropropane dianhydride; 1,1-bis[4-(3,4-dicarboxylphenoxy)phenyl]-1-phenyl-2,2,2-trifluoroethane dianhydride; and 4,4'-bis[2-(3,4-dicarboxylphenyl)hexafluoroisopropyl]diphenyl ether dianhydride.

The diamine compound represented by Chemical Formula 3 may include one or more selected from m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl)hexafluoroisopropyl]diphenyl ether; 3,3'-diamino-1,1'-diadamantane; N-(3-aminophenyl)-4-aminobenzamide; 4-aminophenyl 3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl]hexafluoropropane; 2,2-bis[4-(2-chloro-4-aminophenoxy)phenyl] hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl)buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl]diphenyl ether, diaminocyclohexane, bicyclohexyldiamine, 4,4'-diaminocyclohexylmethane, and diaminofluorene.

The hydroxy diamine compound represented by Chemical Formula 4 may be one or more selected from 3,3'-dihydroxy benzidine; 3,4'-diamino-3'4-dihydroxybiphenyl; 3,3'-diamino-4,4'-dihydroxybiphenyl; 3,3'-dihydroxy-4,4'-diamino diphenyl oxide; 3,3'-dihydroxy-4,4'-diamino diphenylsulphone; bis(3-amino-4-hydroxyphenyl) sulfone; 2,2-bis-(3-amino-4-hydroxyphenyl)propane; bis-(3-hydroxy-4-aminophenyl)methane; 4,6-diaminoresorcinol; 3,3'-dihydroxy-4, 4'-diamino benzophenone; 1,1-bis-(3-hydroxy-4-aminophenyl)ethane; 1,3-bis-(3-hydroxy-4-aminophenyl) propane; 2,2-bis-(3-hydroxy-4-aminophenyl)propane; and 2,2-bis-(3-amino-4-hydroxyphenyl) hexafluoro-propane.

A mole ratio of the tetracarboxylic dianhydride compound represented by Chemical Formula 2 to the diamine compound represented by Chemical Formula 3 and the hydroxy diamine compound represented by Chemical Formula 4 may be about 0.9 to about 1.1.

A mole ratio of the hydroxy diamine compound represented by Chemical Formula 4 relative to the hydroxy diamine compound represented by Chemical Formula 4 and the diamine compound represented by Chemical Formula 3 may be greater than 0 and less than about 0.01.

The condensation polymerization may be performed by agitating the composition at a temperature of about 0 to about 100° C., under an inert gas atmosphere as needed.

The imidization may be performed by chemical imidization or thermal imidization.

The heat treating may be performed at a temperature of about 50 to about 500° C., (for example, greater than or equal to about 300° C., or about 350° C. to about 450° C.) under an inert gas atmosphere as needed.

In another embodiment, the electronic device may include the transparent film.

The electronic device may be a flat panel display, a touch screen panel, a solar cell, an e-window, a heat mirror, a transparent transistor, a flexible display, a complementary metal oxide film semiconductor sensor, or a light emitting diode light.

In another embodiment, a composition including polyamic acid represented by Chemical Formula 5 is provided:

Chemical Formula 5

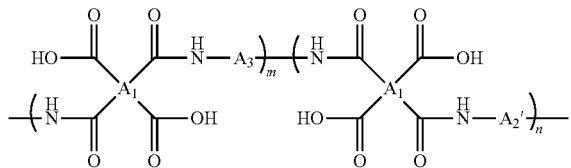

wherein in Chemical Formula 5,
each $A_1$ is the same as or different from each other, and is independently a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $A_2'$ a hydroxy-containing group is selected from chemical formulae:

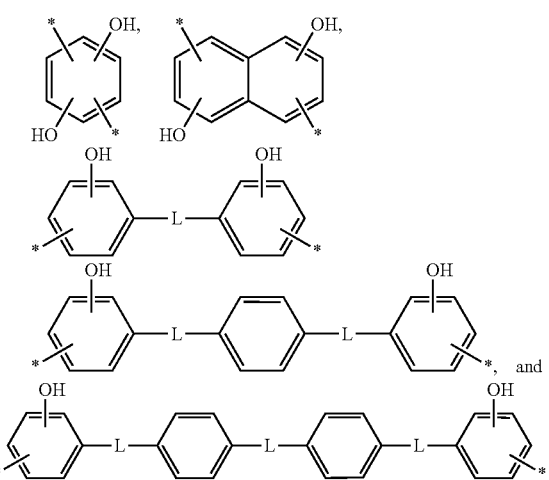

wherein in the chemical formulae,
each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,

* is a point where the residual group is linked to a neighboring atom, and
the —OH substituent is located at the ortho position to the point where the residual group is linked to a neighboring atom, $A_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, m and n are real numbers indicating a mole ratio of an imide repeating unit and a benzoxazole repeating unit, provided that a ratio of n to m is greater than about 0 and less than about 0.01.

In another embodiment, a composition including a polyimide represented by Chemical Formula 6 is provided:

Chemical Formula 6

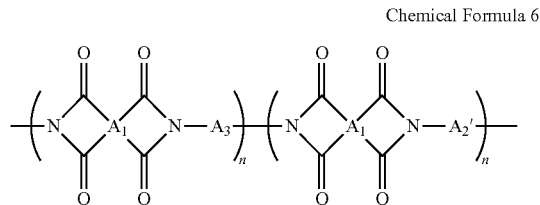

wherein in Chemical Formula 6, each $A_1$ is the same as or different from each other, and is independently a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $A_2'$ is a hydroxy-containing group selected from chemical formulae:

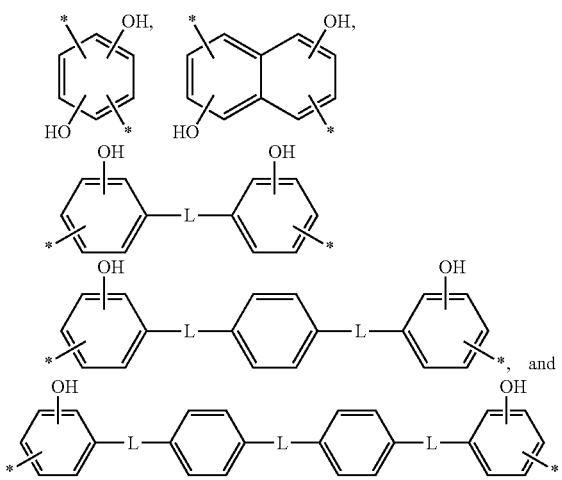

wherein in the chemical formulae, each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,

* is a point where the residual group is linked to a neighboring atom, and the —OH substituent is positioned at the ortho position to the point where the residual group is linked to a neighboring atom, $A_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, m and n are real numbers indicating a mole ratio of an imide repeating unit and a benzoxazole repeating unit, provided that a ratio of n to m is greater than about 0 and less than about 0.01.

In the aforementioned embodiments, it becomes possible to provide a polymer film having improved thermal properties (e.g., low coefficient of thermal expansion). Such a polymer film may find its use in a flexible substrate and various protective films being used in the manufacture of the LEDs, the semiconductor sensors, and the like.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
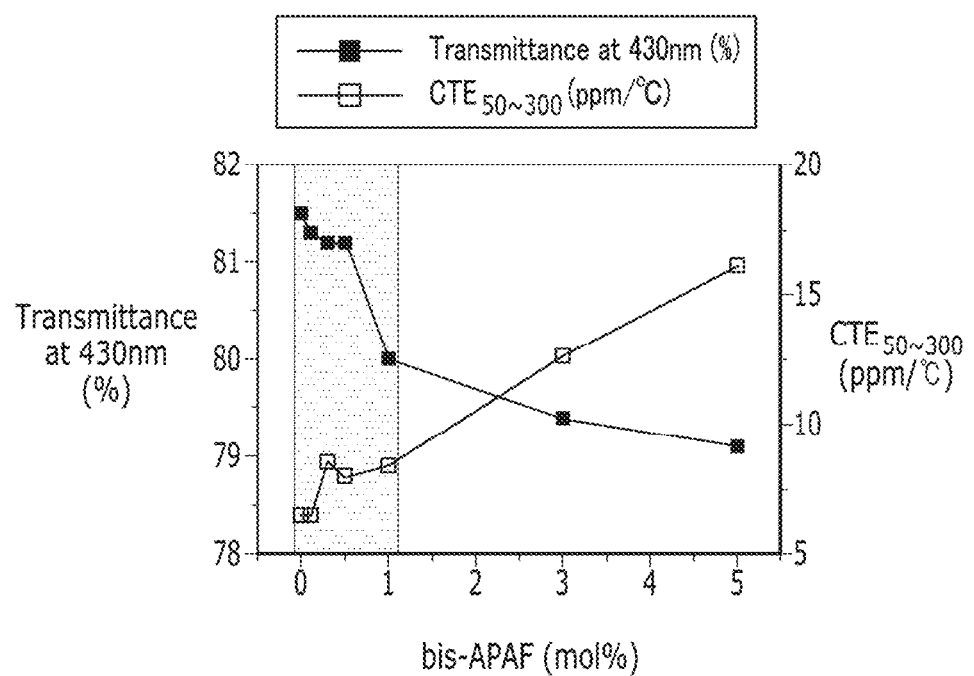
FIG. 1 is a graph of transmittance at 430 nanometers and coefficient of thermal extension (CTE) (parts per million per degree Centigrade, ppm/° C.) versus amount of 2,2-bis(3-amino-4-hydroxyphenyl)hexafluoropropane (bis-APAF) (mole percent, mol %) showing results of Experimental Example 1 and Experimental Example 3.

Hereinafter, exemplary embodiments are described in detail, and may be readily performed by those who have common knowledge in the related art. However, these embodiments are exemplary, and this disclosure is not limited thereto.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when specific definition is not otherwise provided, the term "substituted" refers to one substituted with at least one substituent selected from a halogen (—F, —Cl, —Br, or —I), a hydroxy group, a nitro group, a cyano group, an amino group ($NH_2$, $NH(R^{100})$, or $N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., a cycloalkyl group), a substituted or unsubstituted aryl group (e.g., a benzyl group, a naphthyl group, or a fluorenyl group), a substituted or unsubstituted alkenyl group, a substituted or unsubstituted alkynyl group, a substituted or unsubstituted heteroaryl group, and a substituted or unsubstituted heterocyclic group, instead of at least one hydrogen of the given functional group, and the substituents may be linked to each other to provide a ring.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically C3 to C18 cycloalkyl group, the term "alkoxy group" refers to a C1 to C30 alkoxy group, and specifically C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, and the term "alkenyl group" refers to a C2 to C30 alkenyl group, and specifically a C2 to C18 alkenyl group.

As used herein, the terms "polyimide-polybenzoxazole copolymer" and "poly(imide-benzoxazole) copolymer" have the same meaning and are used interchangeably.

A transparent film includes a polyimide-polybenzoxazole copolymer including a repeating unit represented by the following Chemical Formula 1:

Chemical Formula 1

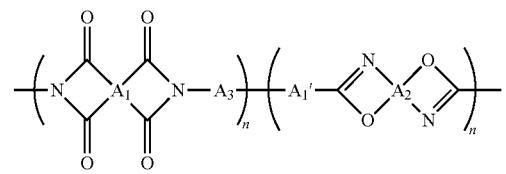

wherein in Chemical Formula 1, $A_1$ is a group derived from a dianhydride compound of Chemical Formula 2 that will be explained below.

In Chemical Formula 1, each $A_1$ is a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group. The rings in the aliphatic ring group, the aromatic ring group, or the hetero aromatic ring group may be present alone. Two or more rings of the aliphatic ring group, the aromatic ring group, or the hetero aromatic ring group may be fused to each other to provide a condensed ring system. Two or more rings of the aliphatic ring group, the aromatic ring group, or the hetero aromatic ring group may be linked through a single bond, —O—, —S—, —C(=O)—, —CH(OH)—, —S(=O)$_2$—, —Si $(CH_3)_2$—, $(CH_2)_p$ (wherein $1 \leq p \leq 10$), $(CF_2)_q$ (wherein $1 \leq q \leq 10$), —$CR_2$— (wherein R is independently hydrogen, a C1 to C10 aliphatic hydrocarbon group (e.g., an alkyl group or an alkenyl group), a C6 to C20 aromatic hydrocarbon group (e.g., an aryl group), or a C6 to C20 alicyclic hydrocarbon group (e.g., a cycloalkyl group)), —$C(CF_3)_2$—, —$C(CF_3)(C_6H_5)$—, or —$C(=O)NH$—. In an embodiment, $A_1$ may be selected from the following chemical formulae:

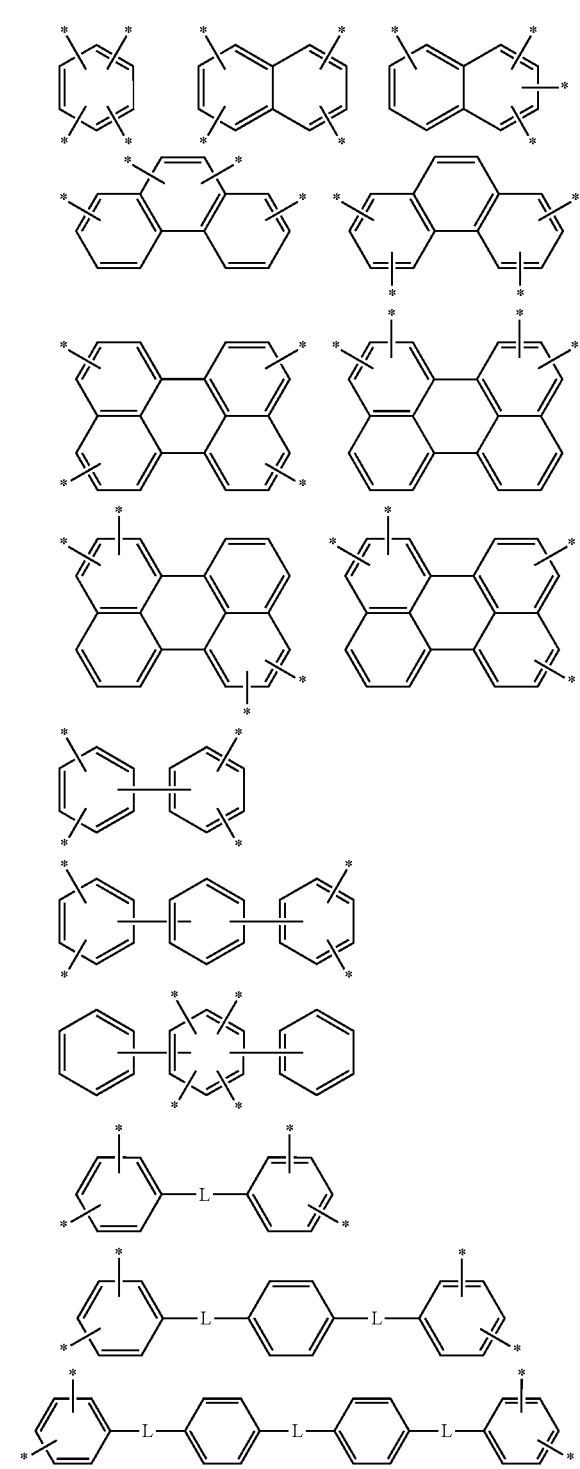

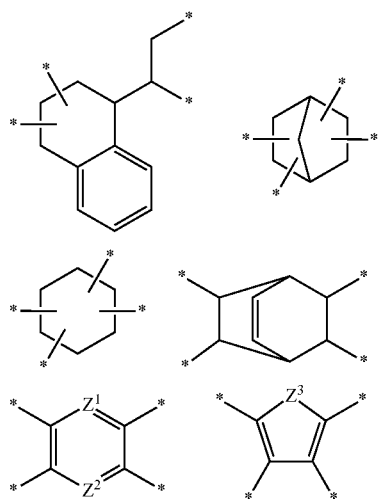

Herein, in the above chemical formulae, each cyclic residual group may be substituted or unsubstituted;

each L is the same as or different from each other, and is independently a single bond, —O—, —S—, —C(=O)—, —CH(OH)—, —S(=O)_2—, —Si(CH_3)_2—, $(CH_2)_p$ (wherein $1 \leq p \leq 10$), $(CF_2)_q$ (wherein $1 \leq q \leq 10$), —$CR_2$— (wherein R is independently hydrogen, a C1 to C10 aliphatic hydrocarbon group, a C6 to C20 aromatic hydrocarbon group, or a C6 to C20 alicyclic hydrocarbon group), —$C(CF_3)_2$—, or —$C(=O)NH$—, $Z^1$ and $Z^2$ are the same or different and are independently —N= or —$C(R^{100})$= wherein $R^{100}$ is hydrogen or a C1 to C5 alkyl group, provided that $Z^1$ and $Z^2$ are not simultaneously —$C(R^{100})$=, $Z^3$ is —O—, —S—, or —$NR^{101}$—, wherein $R^{101}$ is hydrogen or a C1 to C5 alkyl group, and

* is a point where the residual group is linked to a neighboring atom.

For example, A may be selected from the following groups, but is not limited thereto.

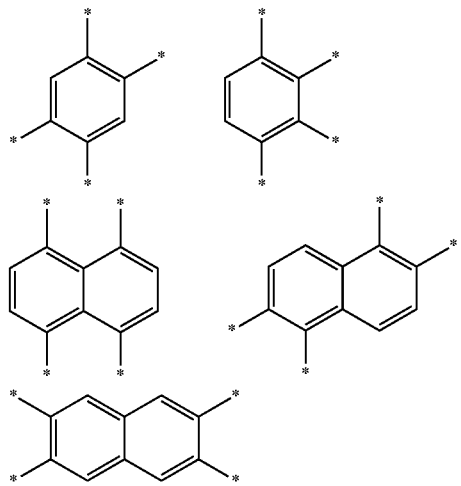

-continued
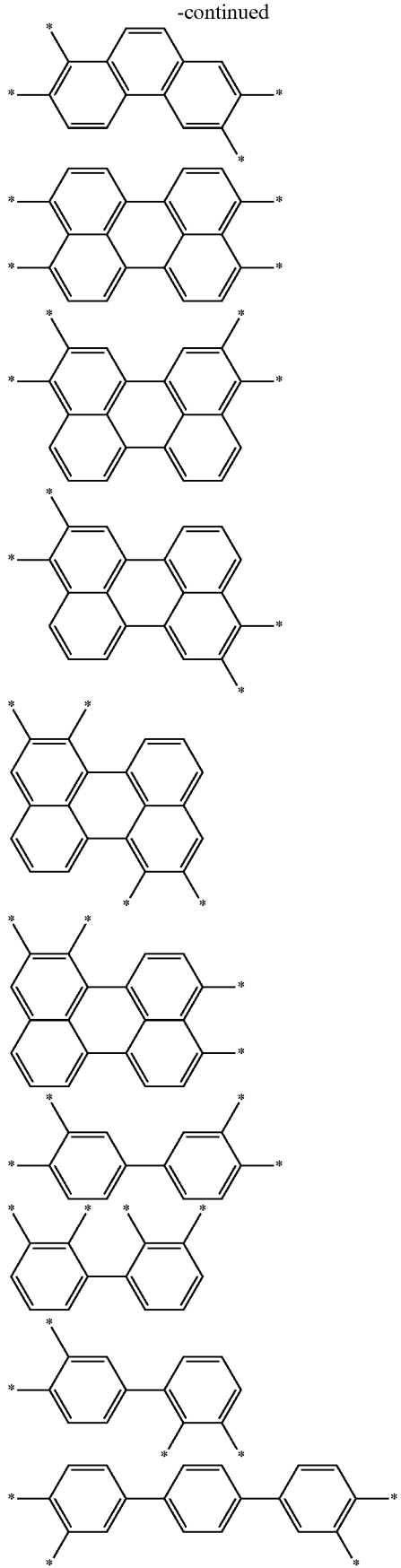
-continued
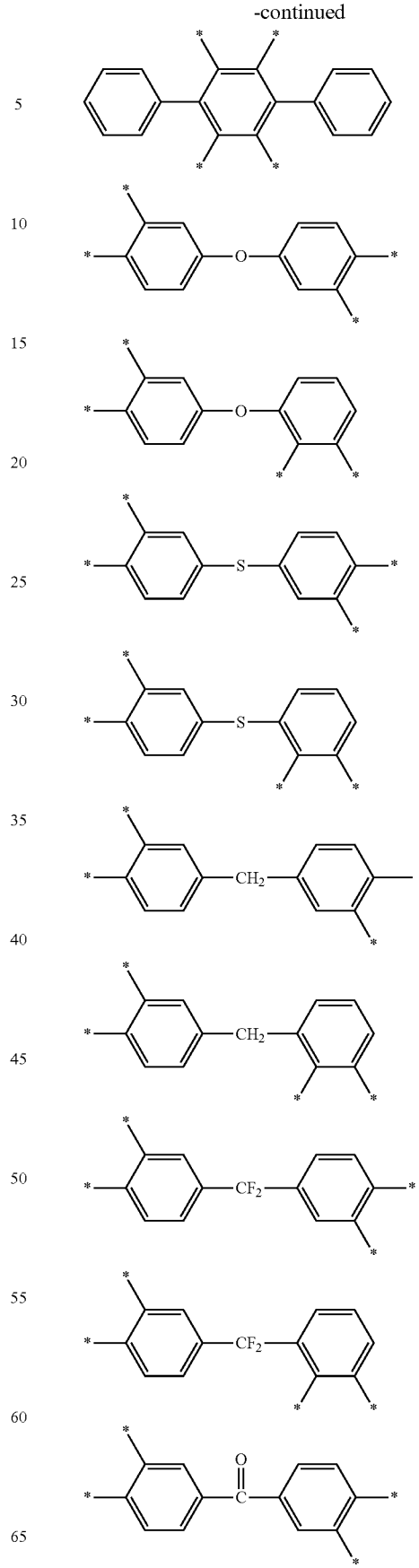

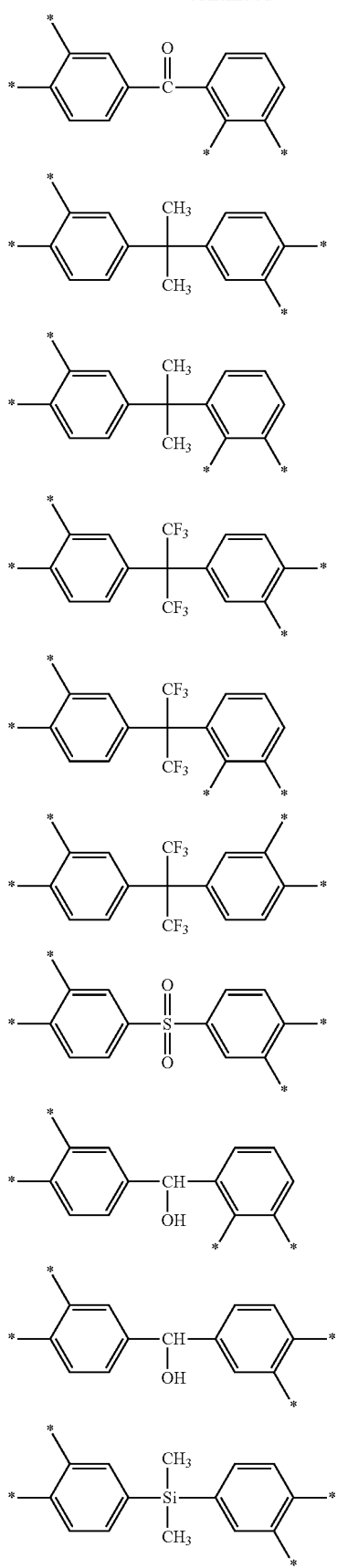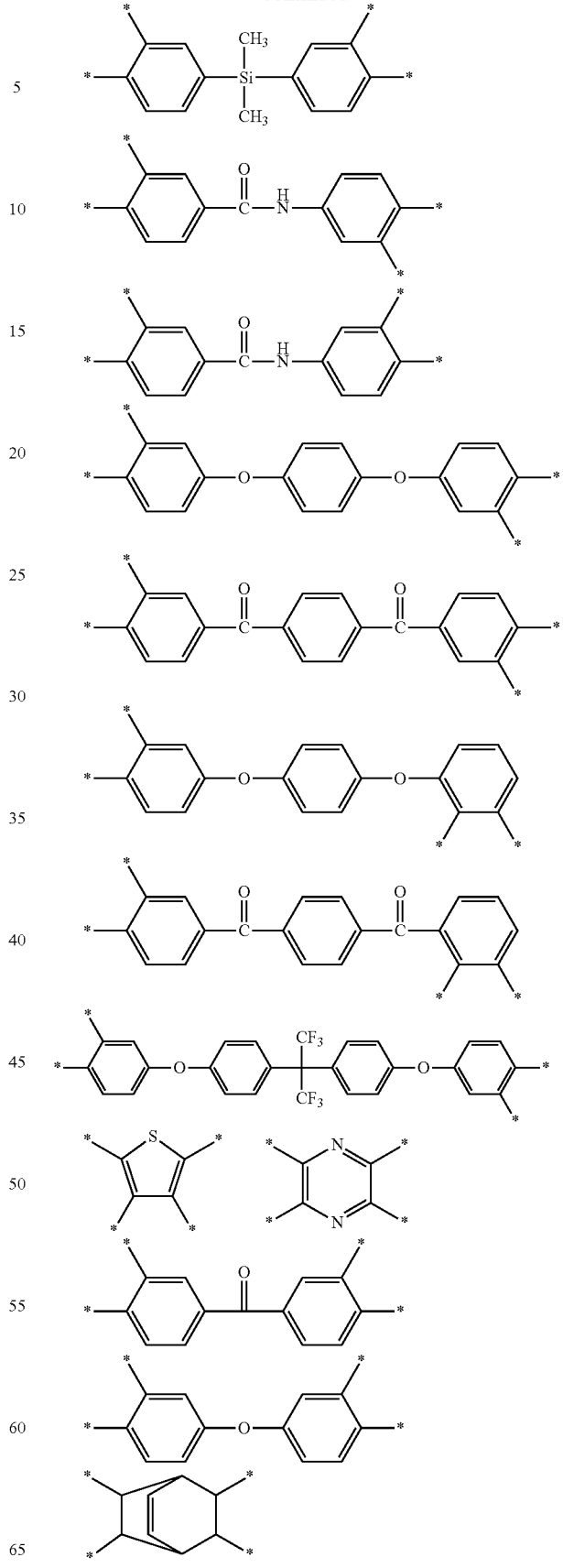

In Chemical Formula 1, $A_1'$ may be a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$-(wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

For example, $A_1'$ may be selected from the following chemical formulae:

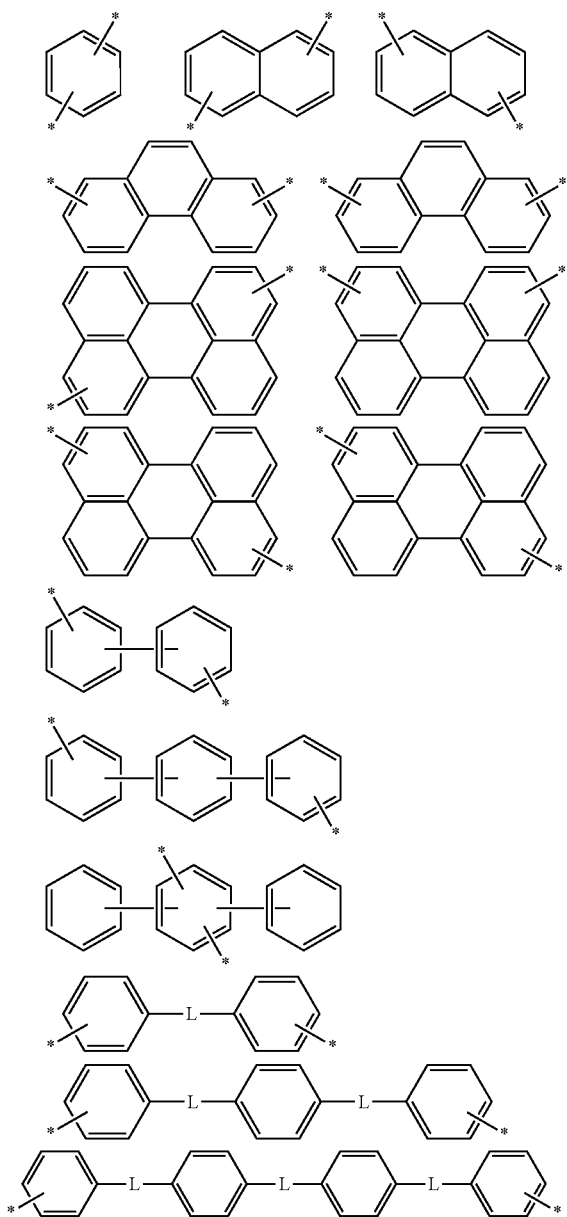

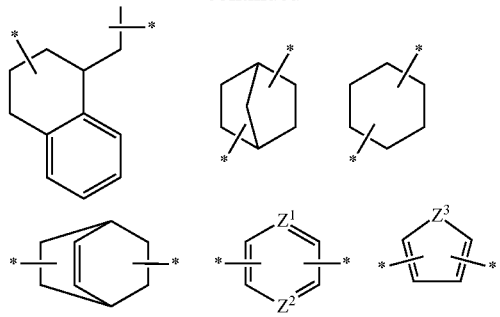

wherein in the above chemical formulae,
each residual group is substituted or unsubstituted,
each L is the same as or different from each other, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,
$Z^1$ and $Z^2$ are the same or different and are independently —N= or —C(R$^{100}$)= wherein R$^{100}$ is hydrogen or a C1 to C5 alkyl group, provided that $Z^1$ and $Z^2$ are not simultaneously —C(R$^{100}$)=,
$Z^3$ is —O—, —S—, or —NR$^{101}$—, wherein R$^{101}$ is hydrogen or a C1 to C5 alkyl group, and
* is a point where the residual group is linked to a neighboring atom.

In Chemical Formula 1, $A_2$ is a residual group derived from hydroxydiamine of Chemical Formula 4 which will be described later. $A_2$ may be selected from the following chemical formulae:

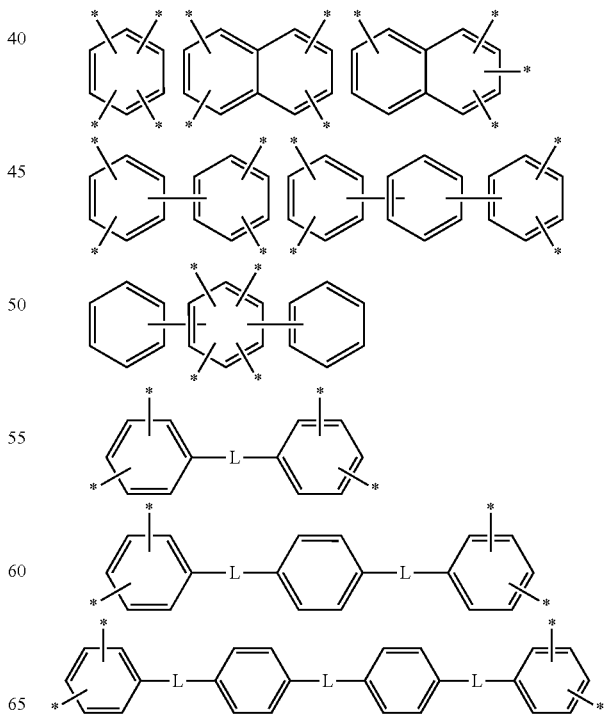

wherein in the above chemical formulae, each residual group may be substituted or unsubstituted, each L is the same or different, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and

* is a point where the residual group is linked to a neighboring atom.

For example, A$_2$ may be selected from the following groups, but is not limited thereto:

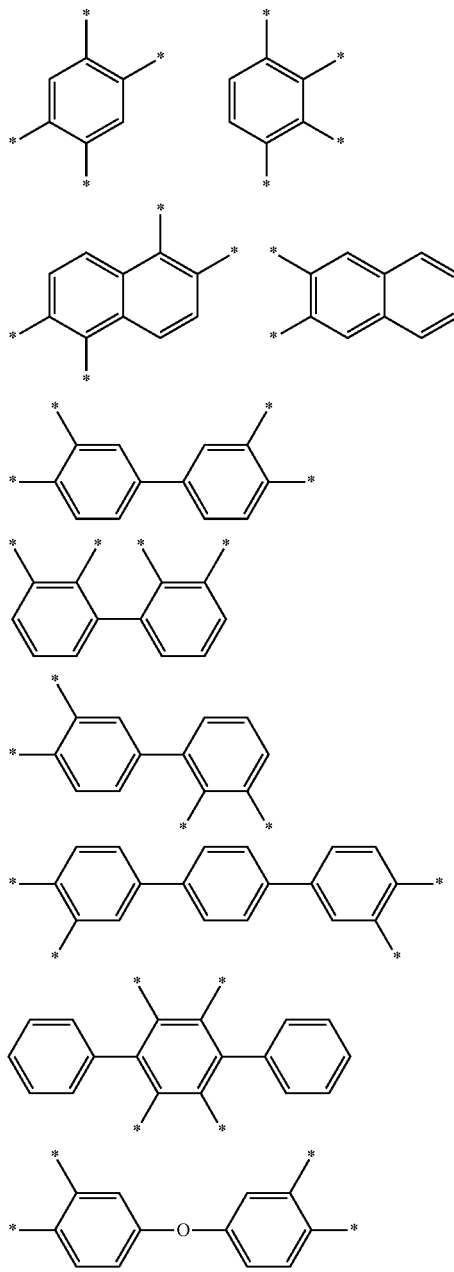
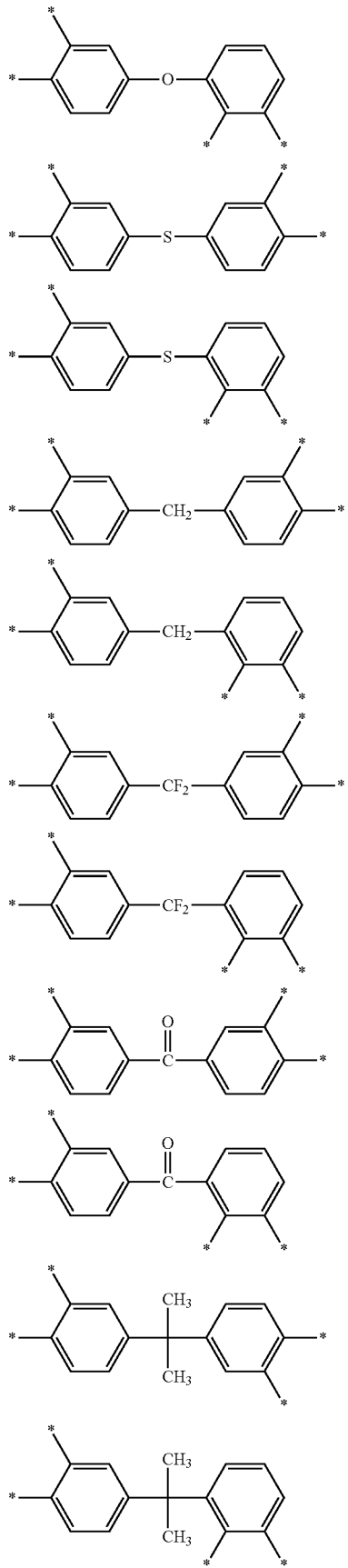

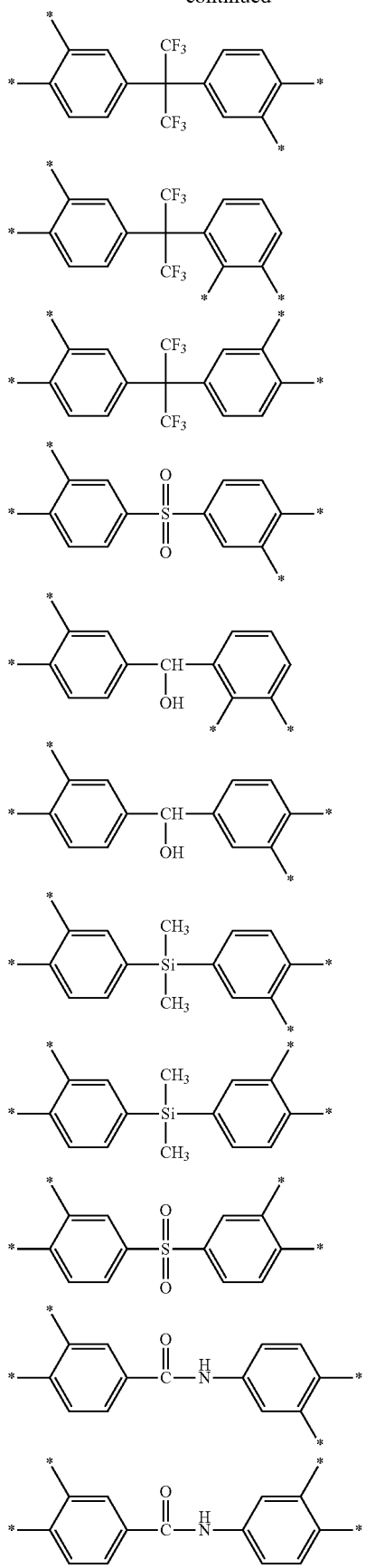

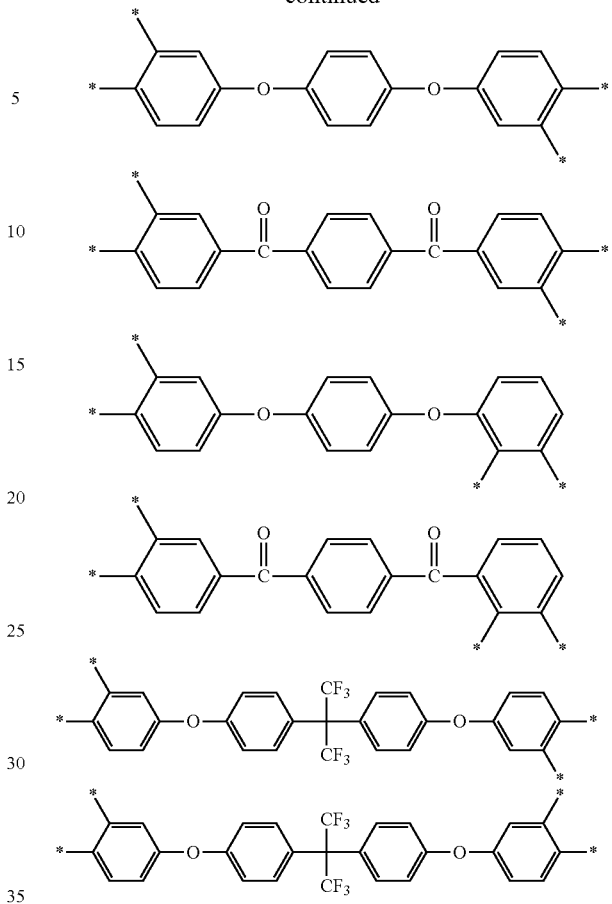

wherein in Chemical Formula 1,

A$_3$ is a residual group derived from a diamine compound represented by Chemical Formula 3 which will be described later, wherein A$_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

The A$_3$ may be selected from the following chemical formulae:

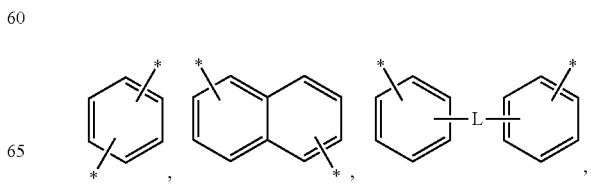

-continued

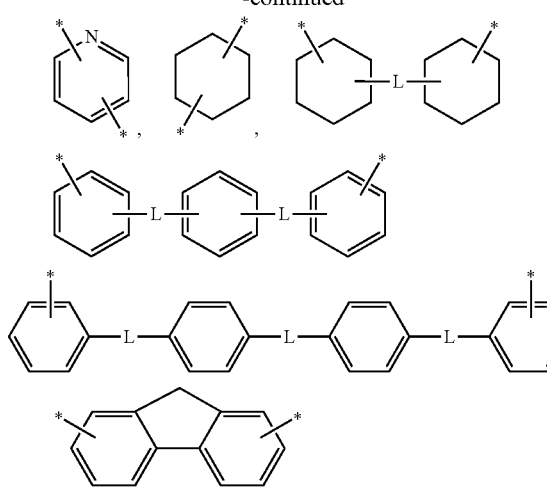

wherein in the above chemical formulae, each residual group is substituted or unsubstituted, each L is the same or different, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and

* is a point where the residual group is linked to a neighboring atom.

For example, A$_3$ may be selected from the following chemical formulae, but is not limited thereto:

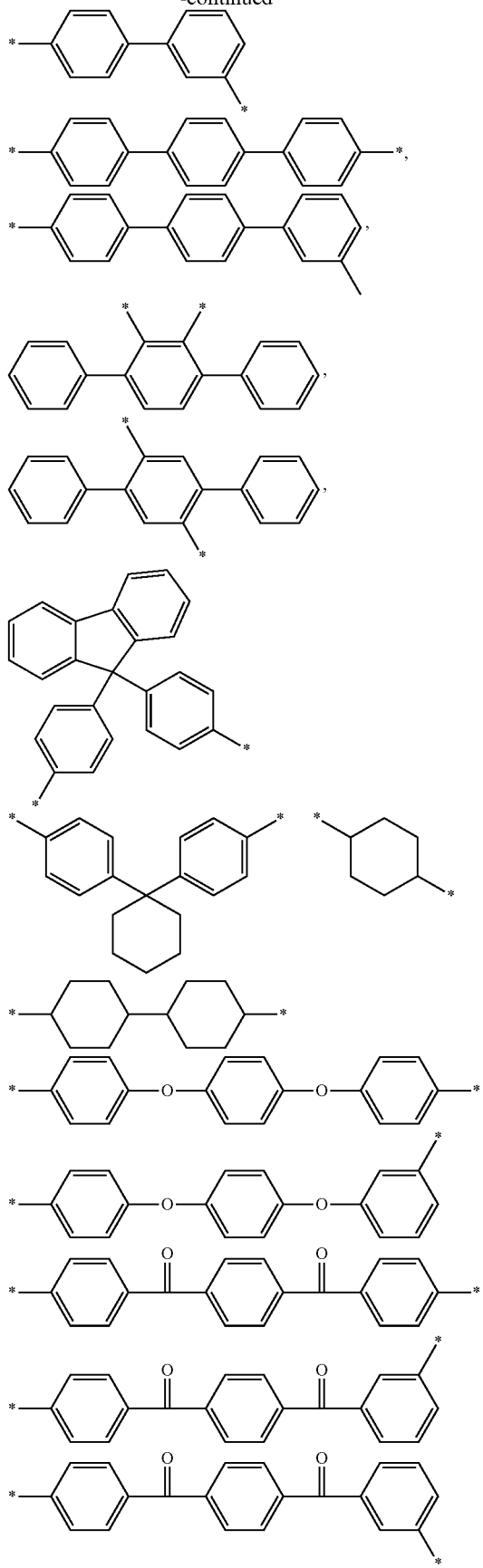

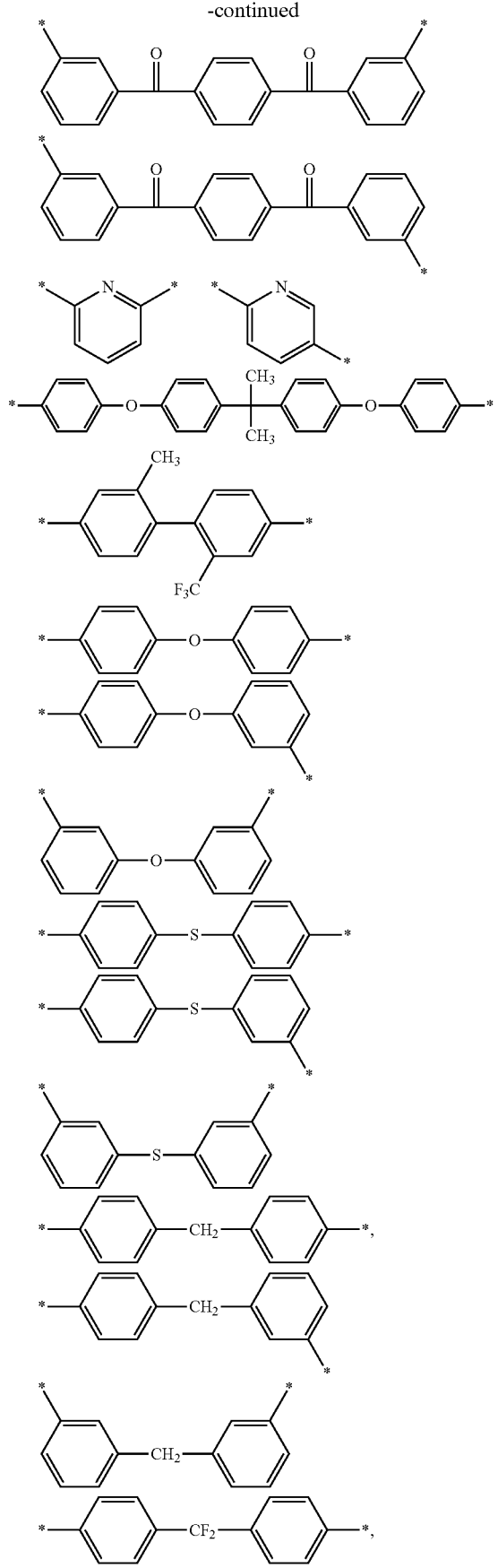
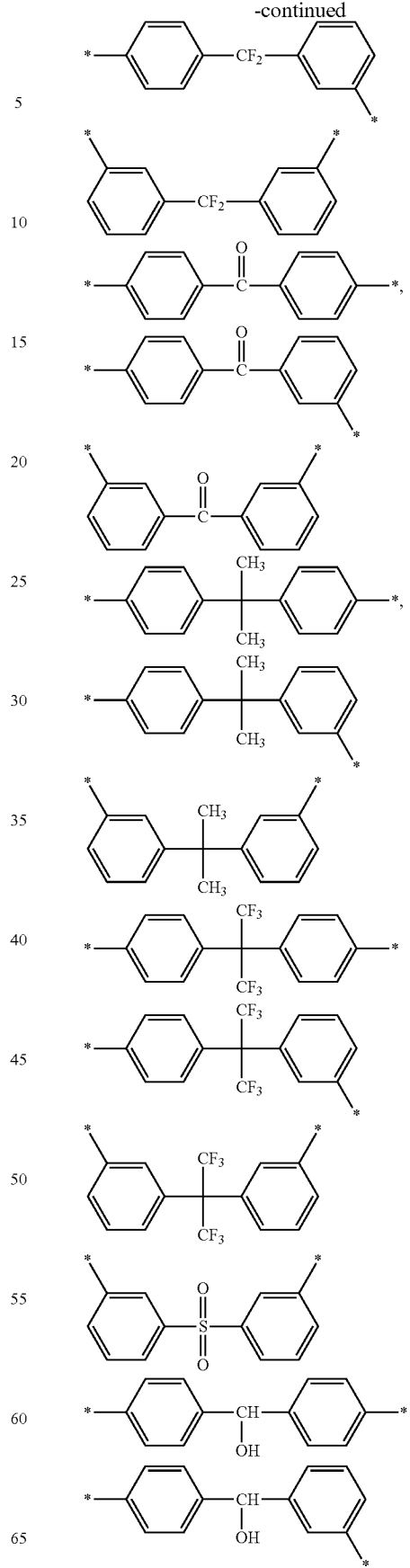

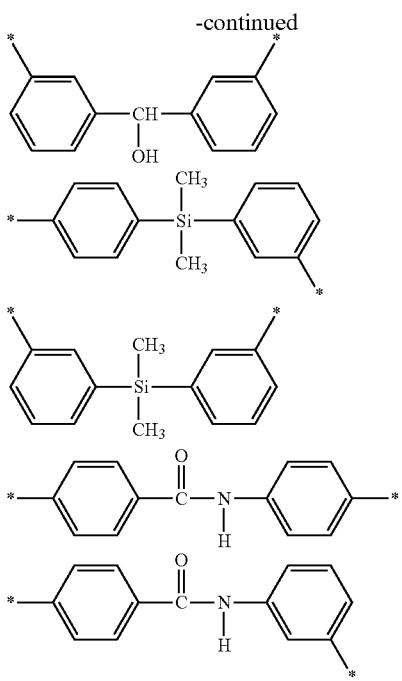

wherein in the above chemical formulae, m and n are real numbers indicating a mole ratio of an imide repeating unit and a benzoxazole repeating unit, provided that a ratio of n to m (n/m) is greater than about 0 and less than about 0.01, for example, about 0.0001 to about 0.009, greater than 0.0005 and less than or equal to about 0.006, or about 0.001 to about 0.005. When the poly(imide-benzoxazole) copolymer has n/m within the range, the film including the same may show improved optical properties, excellent thermal stability, and excellent surface characteristics as described below.

For example, the film has full-wavelength average transmittance of greater than or equal to about 85%, for example, greater than or equal to about 86%, greater than or equal to about 87%, or greater than or equal to about 87.5% on average in a wavelength range of about 300 to about 800 nanometers (nm) when measured at its thickness of about 10 micrometers (μm) with a UV spectrometer. The film may have transmittance of greater than or equal to about 80.5%, for example, greater than or equal to about 81.0%, or greater than or equal to about 81.1% at a wavelength of about 430 nm. The film may have a yellow index of less than or equal to about 5.2, for example, less than or equal to about 5.0, less than or equal to about 4.9, less than or equal to about 4.8, less than or equal to about 4.7, less than or equal to about 4.6, or less than or equal to about 4.5. The film may have a coefficient of thermal expansion (CTE) at a temperature of about 50 to about 300° C. of less than or equal to about 12 parts per million per degree Centigrade (ppm/° C.), for example, less than or equal to about 8.5 ppm/° C., less than or equal to about 8.4 ppm/° C., less than or equal to about 8.2 ppm/° C., less than or equal to about 8.0 ppm/° C., less than or equal to about 7.0 ppm/° C., or less than or equal to about 6.9 ppm/° C.

Accordingly, the film may be satisfactorily used in a flexible substrate, a flexible protective film, or the like requiring excellent mechanical properties, thermal stability, and optical properties.

The film may further include a deposition film formed on the surface of the film. The deposition film may include a silicon oxide, a polysilicic acid, an alkali metal silicate, an alkaline-earth metal silicate, an aluminosilicate, a silicon nitride, a silicon oxynitride, a silicon carbide, a silicon aluminaoxynitride, or a combination thereof.

In an embodiment, this deposition film may be used as a barrier inorganic layer in a flexible substrate and the like. When a metal or a semi-metal oxide/nitride such as SiN is deposited as a film on a polyimide-containing film, surface wrinkles (e.g., a rough surface) cannot be avoided. The surface wrinkles may be serious obstacles to the application of a flexible substrate or a protective film. On the contrary, on the film formed from a copolymer obtained by introducing an exceedingly small amount of a polybenzoxazole repeating unit into polyimide according to an embodiment, the metal or semi-metal oxide/nitride film may be deposited without the surface wrinkles.

In another embodiment, a method of manufacturing the transparent film may include the following steps:

obtaining a composition including a polyamic acid copolymer represented by the following Chemical Formula 5 which is a condensation polymerization product of a tetracarboxylic dianhydride compound represented by the following Chemical Formula 2, a diamine compound represented by the following Chemical Formula 3, and a hydroxy diamine compound represented by the following Chemical Formula 4 including a hydroxy group located at an ortho position to an amine group;

coating the composition including the polyamic acid copolymer on a substrate and imidizing the same to obtain a film including a polyimide copolymer represented by the following Chemical Formula 6; and heat-treating the film to obtain a transparent film including a polyimide-polybenzoxazole copolymer including a repeating unit represented by the above Chemical Formula 1:

Chemical Formula 2

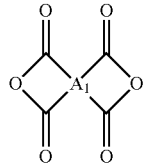

Chemical Formula 3

NH$_2$—A$_3$—NH$_2$

Chemical Formula 4

NH$_2$—A$_2'$—NH$_2$

Chemical Formula 5

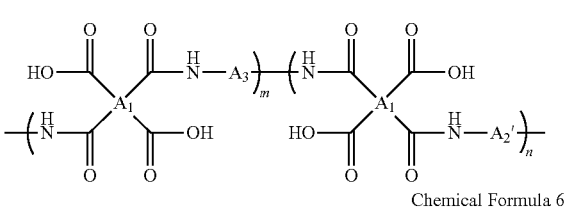

Chemical Formula 6

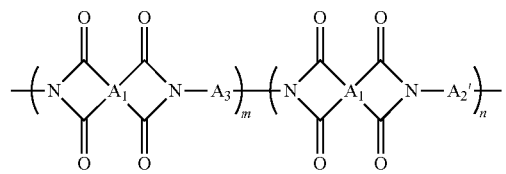

wherein in the above chemical formulae, each $A_1$ is the same or different, and is independently a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, $A_2$' is a hydroxy-containing group selected from chemical formulae,

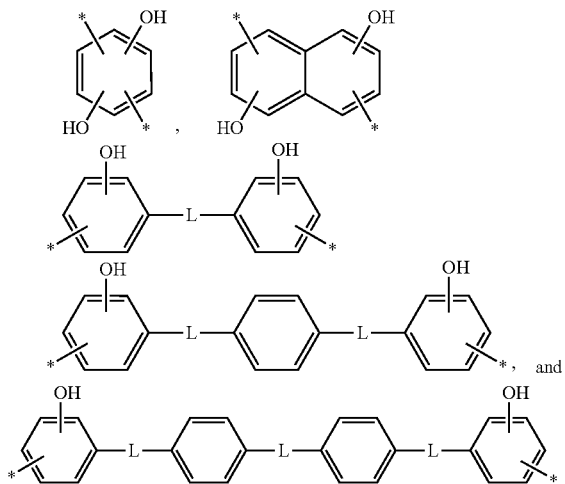

wherein in the chemical formulae, each L is the same or different, and is independently a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,

* is a point where the residual group is linked to a neighboring atom, and the hydroxy group (—OH) is located at the ortho position to the point where the residual group is linked to a neighboring atom, $A_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ (wherein 1≤p≤10), (CF$_2$)$_q$ (wherein 1≤q≤10), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, m and n are real numbers indicating a mole ratio of an imide repeating unit and a benzoxazole repeating unit, provided that a ratio of n to m (n/m) is greater than about 0 and less than about 0.01.

The tetracarboxylic dianhydride compound represented by Chemical Formula 2 may include one or more selected from 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene) diphthalic anhydride (6FDA), 4,4'-oxydiphthalic anhydride (ODPA), pyromellitic dianhydride (PMDA), 4-(2,5-dioxo-tetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 3,3',4,4'-biphenyl tetracarboxylic dianhydride; 2,2',3,3'-biphenyl tetracarboxylic dianhydride; 4,4'-bis(3,4-dicarboxyphenoxy)diphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxylphenoxy) diphenylsulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride;

1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy)phenyl]propane dianhydride; 2,2-bis[4-(3,4-dicarboxylphenoxy)phenyl]propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl)phenyl]propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 2,2-bis(3,4-dicarboxylphenyl) hexafluoropropane dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy)phenyl] hexafluoropropane dianhydride; 1,1-bis[4-(3,4-dicarboxylphenoxy)phenyl]-1-phenyl-2,2,2-trifluoroethane dianhydride; and 4,4'-bis[2-(3,4-dicarboxylphenyl) hexafluoroisopropyl]diphenyl ether dianhydride. Such dianhydride compounds may be commercially available or may be obtained by a method known to one of ordinary skill in the art. In an exemplary embodiment, the tetracarboxylic dianhydride may be a mixture of 3,3',4,4'-biphenyl tetracarboxylic dianhydride (BPDA) and pyromellitic dianhydride (PMDA) in a ratio of about 50 to 95:about 5 to 50, for example about 60 to 90:about 10 to 40, or for example about 70 to 80:about 20 to 30.

The diamine compound represented by Chemical Formula 3 may include one or more selected from m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl)hexafluoroisopropyl]diphenyl ether; 3,3'-diamino-1,1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl]hexafluoropropane; 2,2-bis[4-(2-chloro-4-aminophenoxy)phenyl] hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl)hexafluoroisopropyl]diphenyl ether, diaminocyclohexane, bicyclohexyldiamine, 4,4'-diaminocyclohexylmethane, and diaminofluorene. Such diamine compounds may be commercially available or may be obtained by a method known to one of ordinary skill in the art.

For example, the diamine compound may be at least one selected from compounds having the following structures:

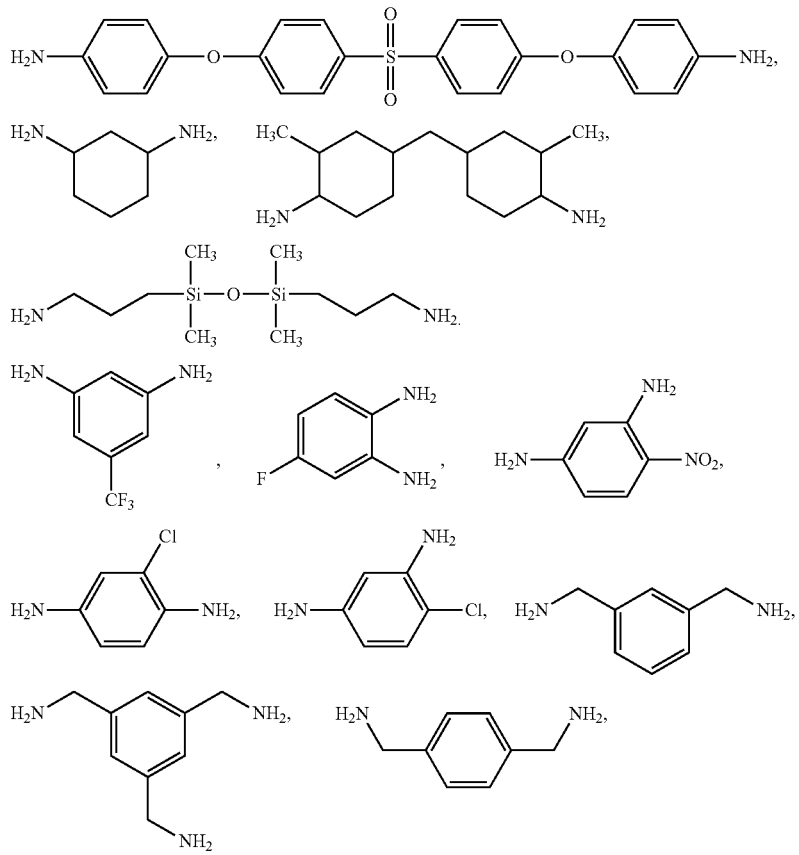

-continued

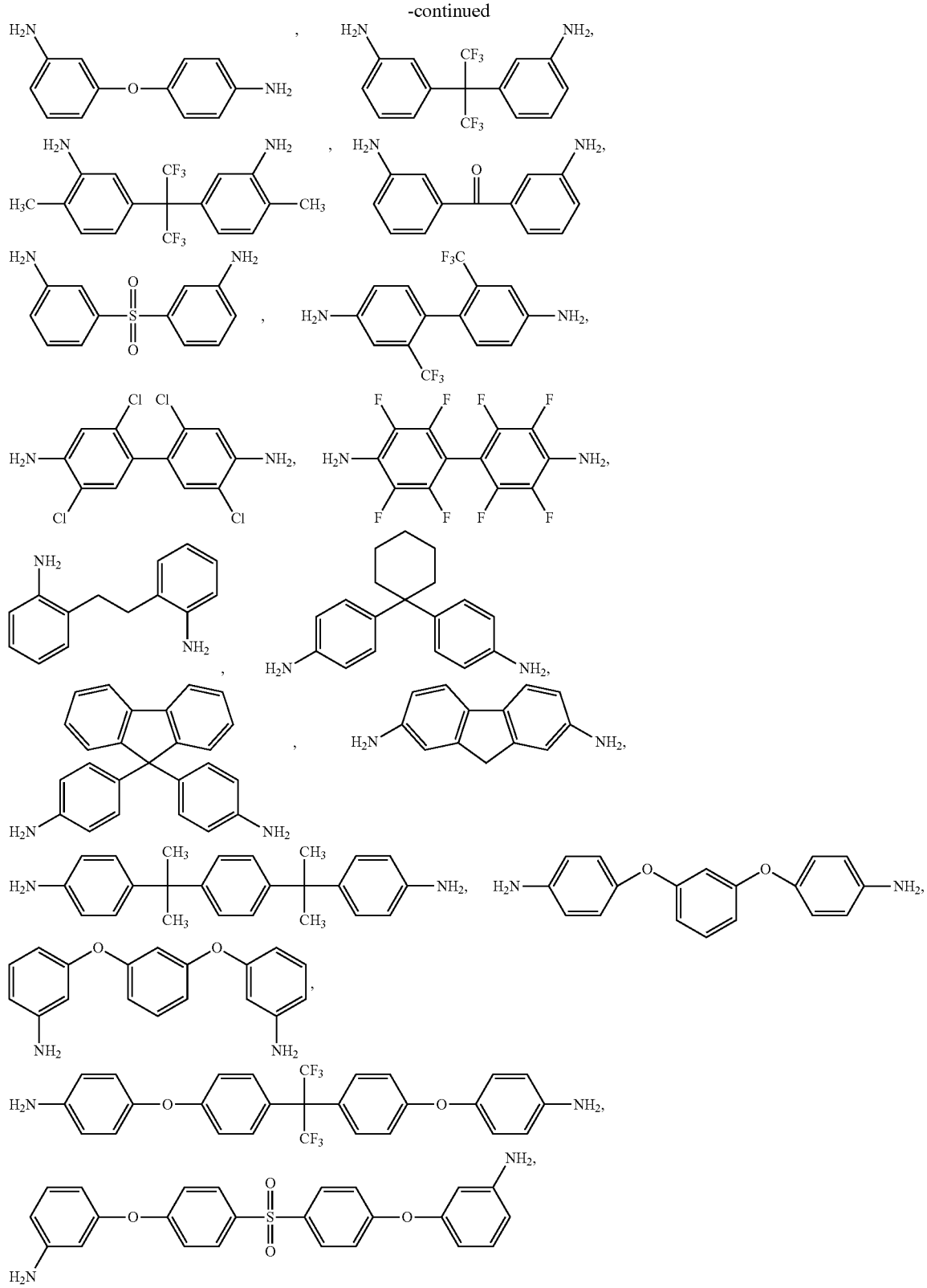

The hydroxy diamine compound may be one or more selected from 3,3'-dihydroxy benzidine; 3,4'-diamino-3'4-dihydroxybiphenyl; 3,3'-diamino-4,4'-dihydroxybiphenyl; 3,3'-dihydroxy-4,4'-diamino diphenyl oxide; 3,3'-dihydroxy-4,4'-diamino diphenylsulphone; bis(3-amino-4-hydroxyphenyl) sulfone; 2,2-bis-(3-amino-4-hydroxyphenyl) propane; bis-(3-hydroxy-4-aminophenyl)methane; 4,6-diaminoresorcinol; 3,3'-dihydroxy-4,4'-diamino benzophenone; 1,1-bis-(3-hydroxy-4-aminophenyl)ethane; 1,3-bis-(3-hydroxy-4-aminophenyl)propane; 2,2-bis-(3-hydroxy-4-aminophenyl)propane; and hexafluoro-2,2-bis-(3-amino-4-hydroxyphenyl)propane.

A mole ratio of the tetracarboxylic dianhydride compound relative to the diamine compound (i.e., the diamine compound of Chemical Formula 3 and the hydroxydiamine compound of Chemical Formula 4) may be about 0.9 to about 1.1, for example, about 0.95 to about 1.05. A mole ratio of the aromatic hydroxy diamine compound of Chemical Formula 4 relative to the diamine compound of Chemical Formula 3 may be less than about 0.01, for example, less than or equal to about 0.009, less than or equal to about 0.008, less than or equal to about 0.007, less than or equal to about 0.006, or less than or equal to about 0.005. A mole ratio of the aromatic hydroxy diamine compound of Chemical Formula 4 relative to the diamine compound of Chemical Formula 3 may be greater than or equal to about 0.0001, for example, greater than or equal to about 0.0003, greater than or equal to about 0.0005, or greater than 0.0005.

The condensation polymerization may be performed by agitating the monomer composition under an air atmosphere or an inert gas atmosphere at a predetermined temperature. A polymerization method is not particularly limited, and may be selected as desired. For example, the condensation polymerization may be performed in a solution including a condensation polymerization catalyst as needed. In case of solution polymerization, a polymerization solvent may be any solvent known to be used for preparation of polyamic acid. Examples of the solvent may be a dipolar aprotic solvent such as N-methyl pyrrolidone (NMP), dimethyl acetamide (DMA), dimethyl formamide (DMF), or dimethyl sulfoxide (DMSO), gamma butyrolactone, and monochlorobenzene, but are not limited thereto. Examples of the condensation polymerization catalyst may be organic acids such as para-toluene sulfonic acid, or metal carboxylates such as a zinc carboxylate salt, but are not limited thereto. The polymerization may be performed by appropriately selecting time and temperature depending on a type of the monomer used. For example, the polymerization may be performed at a temperature of less than or equal to about 100° C., for example, a temperature ranging from about 0° C. to about 100° C. for greater than or equal to about 1 hour, for example, for greater than or equal to about 12 hours. A monomer concentration in the solution may be appropriately selected without a particular limit.

A film including a polyimide copolymer represented by Chemical Formula 6 is obtained by imidizing a composition including a polyamic acid copolymer represented by Chemical Formula 5.

The imidization may be chemical imidization or thermal imidization. Before or after the imidization, drying may be performed at a temperature less than or equal to about 250° C., for example, at a temperature less than or equal to about 200° C., or at a temperature less than or equal to about 190° C. to remove a solvent.

Conditions for the chemical imidization or the thermal imidization are known to one of ordinary skill in the art.

In an embodiment, the chemical imidization may include treating the polyamic acid copolymer, for example, with a reagent such as aliphatic carboxylic dianhydride and a tertiary amine at an ambient temperature. A commonly used reagent may include acetic anhydride, pyridine, triethylamine, and the like. Herein, an imidization degree may vary depending on a solubility degree of a polyimide in an imidization mixture. A product from the chemical imidization may be re-dissolved in an appropriate solvent (e.g., NMP, DMAc) and then manufactured into a film. The obtained film may be heated for example at a high temperature of greater than or equal to about 300° C. for a short time (e.g., within about 3 hours) in order to increase imidization.

The thermal imidization may be performed by coating the polyamic acid copolymer composition on a substrate (e.g., a glass substrate and the like) and heat-treating it. The atmosphere for the thermal imidization may be appropriately selected without a particular limit. As far as the heat treatment is concerned, the polyamic acid copolymer composition may be gradually heated up to a target temperature at a predetermined heating rate or may be heated at a predetermined temperature for a predetermined time by stages.

The heat treatment for the thermal imidization may be performed at a temperature of greater than or equal to about 50° C., for example, greater than or equal to about 200° C., greater than or equal to about 250° C., or greater than or equal to about 280° C., but it is not limited thereto. For example, the thermal imidization may be performed at a temperature of less than or equal to about 350° C., for example, less than or equal to about 330° C., less than or equal to about 320° C., or less than or equal to about 310° C., but it is not limited thereto. For example, the thermal imidization may be performed at a temperature ranging from about 80° C. to about 350° C., from about 80° C. to about 320° C. or from about 80° C. to about 310° C., but the present disclosure is not limited thereto. The heat treatment may be performed at a predetermined temperature by stages or continuously at a predetermined heating rate without a particular limit. The heating rate has no particular limit but may include, for example, greater than or equal to about 1 degree Centigrade per minute (° C./min), greater than or equal to about 5° C./min, or greater than or equal to about 10° C./min.

The film including the polyimide copolymer represented by Chemical Formula 6 may be heat treated to produce a transparent film including the polyimide-polybenzoxazole copolymer including a repeating unit represented by Chemical Formula 1.

Conditions for the heat treatment are not particularly limited as long as a benzoxazole ring is formed through a cyclization reaction between an imide residual group of the polyimide and a neighboring hydroxy group of $Ar_2'$. For example, the heat treatment may be performed at a temperature of greater than or equal to about 350° C., for example, greater than or equal to about 360° C., greater than or equal to about 370° C., greater than or equal to about 380° C., greater than or equal to about 390° C., and greater than or equal to about 400° C. For example, the heat treatment may be performed at a temperature of greater than or equal to about 500° C. The time, the conditions, and the atmosphere of the heat treatment may be selected appropriately and are not particularly limited. For example, the heat treatment may be performed under an inert gas (e.g., nitrogen, argon, and the like) atmosphere.

The formation of the polyamic acid copolymer, preparation of the poly(hydroxy)imide copolymer by the imidization of the polyamic acid copolymer, and preparation of the polyimide-polybenzoxazole copolymer are, for example, illustrated by using biphenyl dianhydride (BPDA) as a dianhydride of Chemical Formula 2, bis(trifluoromethyl)benzidine (TFDB) as a diamine compound of Chemical Formula 3, and 2,2-bis(3-amino-4-hydroxyphenyl)hexafluoropropane (Bis-APAF) as a hydroxydiamine compound of Chemical Formula 4 according to a reaction scheme as follows.

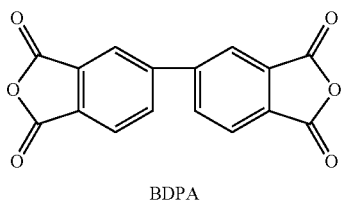
BDPA

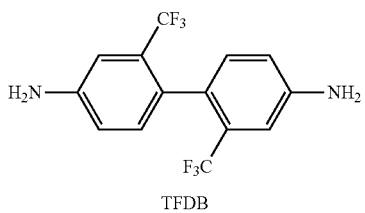
TFDB

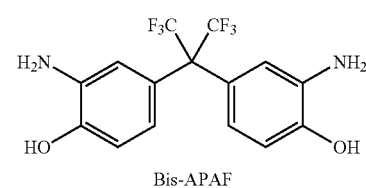
Bis-APAF

⇓ Condensation Polymerization

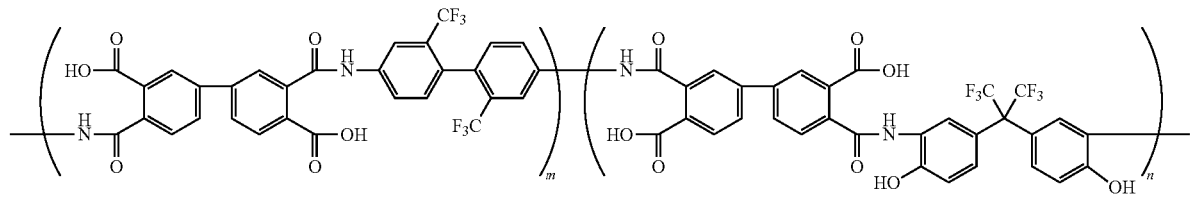

⇓ Imidization
—H₂O

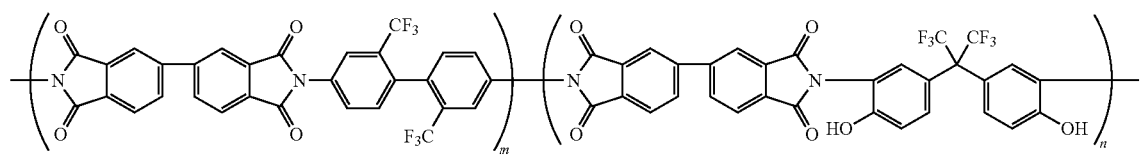

⇓ Cyclization reaction between imide ring and hydroxy group by heat-treatment
—CO₂

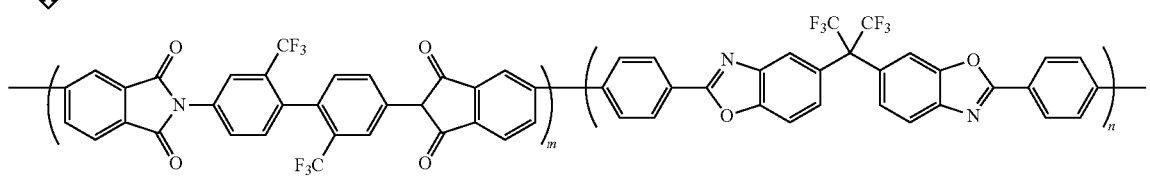

The transparent film obtained by the heat treatment is the same as described above.

In another embodiment, an electronic device includes the transparent film. The electronic device may include a flat panel display, a touch screen panel (TSP), a solar cell, an e-window, a heat mirror, a transparent transistor, a flexible display, a complementary metal oxide film semiconductor sensor, or a light emitting diode light, but the present disclosure is not limited thereto.

As described in detail, the transparent film according to an embodiment has improved optical properties and thermal stability, and may be satisfactorily used as a flexible substrate or a protective film when the electronic device is manufactured. In particular, when a deposition film such as a $SiN_x$ and a $SiO_x$ is formed on a flexible substrate, a surface wrinkle on the polyimide film may be prevented.

Hereinafter, the present disclosure is illustrated in more detail with reference to examples. However, these examples are exemplary, and the present disclosure is not limited thereto.

EXAMPLES

Example 1

[1] Preparation of Polyamic Acid Copolymer 119.65 milliliters (mL) of N-methyl pyrrolidone is placed in a 250 mL reactor, and 14.599 grams (g) (0.0456 moles (mol)) of 2,2'-bis(trifluoromethyl)benzidine (TFDB) and 0.0167 g (0.0456 mmol) of 2,2-bis(3-amino-4-hydroxyphenyl)hexafluoropropane (bis-APAF) as a diamine monomer are added thereto. The solids were completely dissolved therein via stirring to prepare a diamine mixture solution. 9.398 g (0.0319 mol) of 3,3',4,4'-biphenyltetracarboxylic dianhydride (BPDA) and 2.986 g (0.0137 mol) of pyromellitic dianhydride (PMDA) are quickly added to the diamine mixture solution, and the obtained mixture is stirred at room temperature for 48 hours, obtaining a solution including a polyamic acid copolymer as a condensation polymerization product. The ratio of the Bis-APAF to the TFDB ratio in the copolymer is 0.1 mol % (0.001).

[2] Thermal Imidization

The solution is spin-coated on a glass substrate and heated at 80° C. to remove a solvent included in the coating. Subsequently, the coating is heated up to 300° C. at a rate of 10° C./min under a nitrogen atmosphere and maintained at this temperature for one hour to perform thermal imidization, obtaining a polyimide copolymer film.

[3] Heat Treatment for Forming Poly(imide-benzoxazole) Copolymer

The obtained polyimide copolymer film is heated up to 400° C. at 10° C./min under a nitrogen atmosphere and maintained at this temperature for 30 minutes, obtaining a film including a poly(imide-benzoxazole) copolymer.

Example 2

A film including a poly(imide-benzoxazole) copolymer is obtained according to the same method as described in Example 1, except for using 14.567 g (0.0455 mol) of 2,2'-bis(trifluoromethyl)benzidine (TFDB) and 0.05 g (0.137 mmol) of 2,2-bis(3-amino-4-hydroxyphenyl)hexafluoropropane (Bis-APAF) as a diamine monomer. The Bis-APAF to the TFDB ratio in the copolymer is 0.3 mol % (0.003).

Example 3

A film including a poly(imide-benzoxazole) copolymer is prepared according to the same method as Example 1, except for using 14.536 g (0.0454 mol) of 2,2'-bis(trifluoromethyl)benzidine (TFDB) and 0.0835 g (0.228 mmol) of 2,2-bis(3-amino-4-hydroxyphenyl)hexafluoropropane (Bis-APAF) as a diamine monomer. The Bis-APAF to the TFDB ratio in the copolymer is 0.5 mol % (0.005).

Example 4

A film including a poly(imide-benzoxazole) copolymer is prepared according to the same method as Example 1, except for using 14.6 g (0.0456 mol) of 2,2'-bis(trifluoromethyl)benzidine (TFDB) and 0.0128 g (0.0456 mmol) of bis(3-amino-4-hydroxyphenyl)sulfone (Bis-APS) as a diamine monomer. The Bis-APS to the TFDB ratio in the copolymer is 0.1 mol % (0.001).

Example 5

A film including a poly(imide-benzoxazole) copolymer is prepared according to the same method as described in Example 1, except for using 14.57 g (0.0455 mol) of 2,2'-bis(trifluoromethyl)benzidine (TFDB) and 0.0384 g (0.137 mmol) of bis(3-amino-4-hydroxyphenyl)sulfone (Bis-APS) as a diamine monomer. The Bis-APS to the TFDB ratio in the copolymer is 0.3 mol % (0.003).

Example 6

A film including a poly(imide-benzoxazole) copolymer is prepared according to the same method as described in Example 1, except for using 14.55 g (0.0454 mol) of 2,2'-bis(trifluoromethyl)benzidine (TFDB) and 0.064 g (0.23 mmol) of bis(3-amino-4-hydroxyphenyl)sulfone (Bis-APS) as a diamine monomer. The Bis-APS to the TFDB ratio in the copolymer is 0.5 mol % (0.005).

Comparative Example 1

A film including a polyimide polymer is prepared according to the same method as described in Example 1, except for using 14.615 g (0.0456 mol) of 2,2'-bis(trifluoromethyl)benzidine (TFDB) as a diamine monomer.

Comparative Example 2

A film including a poly(imide-benzoxazole) copolymer is prepared according to the same method as described in Example 1, except for using 14.457 g (0.0451 mol) of 2,2'-bis(trifluoromethyl)benzidine (TFDB) and 0.167 g (0.456 mmol) of 2,2-bis(3-amino-4-hydroxyphenyl)hexafluoropropane (Bis-APAF) as a diamine monomer. The Bis-APAF to the TFDB ratio in the copolymer is 1 mol % (about 0.01).

Comparative Example 3

A film including a poly(imide-benzoxazole) copolymer is prepared according to the same method as described in Example 1, except for using 14.143 g (0.0442 mol) of 2,2'-bis(trifluoromethyl)benzidine (TFDB) and 0.5 g (1.366 mmol) of 2,2-bis(3-amino-4-hydroxyphenyl)hexafluoropropane (Bis-APAF) as a diamine monomer. The Bis-APAF to the TFDB ratio in the copolymer is 3 mol %.

Comparative Example 4

A film including a poly(imide-benzoxazole) copolymer is prepared according to the same method as described in Example 1, except for using 13.83 g (0.0432 mol) of 2,2'-bis(trifluoromethyl)benzidine (TFDB) and 0.8325 g (2.273 mmol) of 2,2-bis(3-amino-4-hydroxyphenyl)hexafluoropropane (Bis-APAF) as a diamine monomer. The Bis-APAF to the TFDB ratio in the copolymer is 5 mol %.

Experimental Example 1: Measurement of Light Transmittance

The transmittance (%) at a full-wavelength and the transmittance (%) at a wavelength of 430 nm of the films of Examples 1 to 3 and Comparative Examples 1 to 4 regarding light ranging from 300 to 800 nm are measured in the following method.

The transmittance is measured by cutting a part of a sample into a size of a width of 300 millimeters (mm)×a length of 300 mm and using a spectrophotometer, CM-3600d made by Konica Minolta Sensing Americas, Inc.

The results are provided in the following Table 1 and FIG. 1.

Experimental Example 2: Measurement of Yellow Index

The yellow index (YI) of each film of Examples 1 to 3 and Comparative Examples 1 to 4 is measured according to the following method.

The yellow index is measured by cutting a sample into a width of 300 mm×a length of 300 mm and using a spectrophotometer, CM-3600d made by Konica Minolta Sensing Americas, Inc.

The results are provided in the following Table 1.

Experimental Example 3: Measurement of Coefficient of Thermal Expansion (CTE)

The coefficient of thermal expansion (CTE) of each film of Examples 1 to 3 and Comparative Examples 1 to 4 is measured according to the following method.

The coefficient of thermal expansion (CTE) is measured by cutting a part of a sample into a width of 5 mm×a length of 20 mm and using a thermal mechanical apparatus Q400 made by TA Instruments. A sample is hung on a quartz hook and heated from 30° C. to 400° C. at a rate of 10 degrees Centigrade per minute (° C./min) under a nitrogen atmosphere after applying a force of 0.050 Newtons (N) thereto. The coefficient of thermal expansion is obtained in a range of 50° C. to 300° C.

The results are provided in the following Table 1 and FIG. 1.

TABLE 1

| | Amount of Bis-APAF (mol %) | Transmittance (%) | | Yellow index (YI) | CTE (ppm/° C.) |
|---|---|---|---|---|---|
| | | full-wavelength transmittance | Transmittance at 430 nm | | |
| Comparative Example 1 | 0 | 87.6 | 81.5 | 4.3 | 6.5 |
| Example 1 | 0.1 | 87.5 | 81.3 | 4.4 | 6.5 |
| Example 2 | 0.3 | 87.5 | 81.2 | 4.4 | 8.5 |
| Example 3 | 0.5 | 87.5 | 81.2 | 4.5 | 8.0 |
| Comparative Example 2 | 1 | 87.3 | 80 | 5.2 | 8.4 |
| Comparative Example 3 | 3 | 87.3 | 79.4 | 5.5 | 12.6 |
| Comparative Example 4 | 5 | 87.3 | 79.1 | 5.7 | 16.1 |

Referring to the results of Table 1 and FIG. 1, each film including a poly(imide-benzoxazole) copolymer according to Examples 1 to 3 showed an improved value in terms of transmittance and yellow index but a low CTE, and thus had excellent thermal stability compared to each film according to Comparative Examples 2 to 4.

Example 7

A film including a poly(imide-benzoxazole) copolymer is prepared according to the same manner as Example 1, except for using 0.0456 mol of BPDA as a dianhydride monomer and not using PMDA. The Bis-APAF to the TFDB ratio in the copolymer is 0.1 mol % (0.001).

Example 8

A film including a poly(imide-benzoxazole) copolymer is prepared according to the same manner as Example 1, except for using 0.0456 mol of PMDA as a dianhydride monomer and not using BPDA. The Bis-APAF to the TFDB ratio in the copolymer is 0.1 mol % (0.001).

Example 9

A film including a poly(imide-benzoxazole) copolymer is prepared according to the same manner as Example 1, except for using 0.0456 mol of 1,2,4,5-cyclohexane tetracarboxylic dianhydride (CAS No: 2754-41-8) as a dianhydride monomer instead of BPDA and PMDA. The Bis-APAF to the TFDB ratio in the copolymer is 0.1 mol % (0.001).

Example 10

A film including a poly(imide-benzoxazole) copolymer is prepared according to the same manner as Example 1, except for using 0.0456 mol of 4,4'-(hexafluoroisopropylidene)diphthalic anhydride (6FDA) (CAS Number 1107-00-2) as a dianhydride monomer instead of BPDA and PMDA. The Bis-APAF to the TFDB ratio in the copolymer is 0.1 mol % (0.001).

Example 11

A film including a poly(imide-benzoxazole) copolymer is prepared according to the same manner as Example 1, except for using 1,4-cyclohexane diamine (CAS Number 2615-25-0) as a diamine monomer instead of TFDB. The Bis-APAF to the 1,4-cyclohexane diamine ratio in the copolymer is 0.1 mol % (0.001).

Example 12

A film including a poly(imide-benzoxazole) copolymer is prepared according to the same manner as Example 1, except for using 2,7-diaminofluorene, CAS no. 525-64-4) as a diamine monomer instead of TFDB. The Bis-APAF to the 2,7-diaminofluorene ratio in the copolymer is 0.1 mol % (0.001).

Example 13

A film including a poly(imide-benzoxazole) copolymer is prepared according to the same manner as Example 1, except for using 4,4-diamino dicyclohexyl methane as a diamine monomer instead of TFDB. The Bis-APAF to the 4,4-diamino dicyclohexyl methane ratio in the copolymer is 0.1 mol % (0.001).

Experimental Example 4: Measurement of Light Transmittance, Yellow Index, and Coefficient of Thermal Expansion (CTE)

For each film obtained from Examples 7 to 13, the light transmittance (%), the yellow index, and the CTE are measured in accordance with the manners set forth in Experimental Examples 1 to 3. The results confirm that each film of Examples 7 to 13 showed an improved value in terms of transmittance and yellow index but a low CTE, and thus had excellent thermal stability compared to each film according to Comparative Examples 2 to 4.

Experiment of the Formation Si Oxide Deposition Film

[1] Formation of Film Including Poly(imide-benzoxazole) Copolymer

Films 1, 2, and 3 including a poly(imide-benzoxazole) copolymer are obtained according to the same method as Example 1, except that 2,2'-bis(trifluoromethyl)benzidine (TFDB) and 2,2-bis(3-amino-4-hydroxyphenyl)hexafluoropropane (Bis-APAF) are used as a diamine monomer and the amount ratio of the Bis-APAF to the TFDB is 0.01 mol %, 0.03 mol %, and 0.05 mol %, respectively.

[2] Formation of Si Oxide Deposition Film

Each Si oxide deposition film is formed with the films 1, 2, and 3 and the films according to Examples 1 to 3 and 4 to 6 under the following conditions.

A Si oxide deposition film is respectively formed on each film coated on a glass substrate by performing deposition for 10 minutes at 350° C. under a $SiH_4$, $O_2$, and $N_2$-containing atmosphere by using a plasma enhanced chemical vapor deposition (PECVD) apparatus (BMR's HiDepTm).

Figure 2:
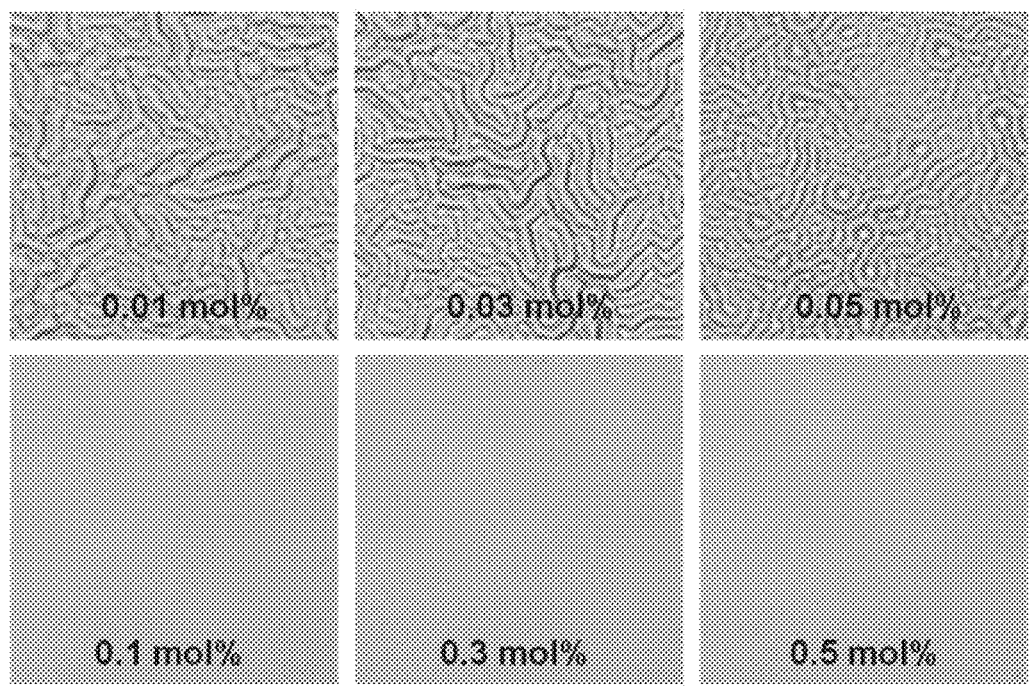
FIG. 2 shows scanning electron microscope (SEM) images of the silicon oxide deposition films formed on Film 1, Film 2, and Film 3, and the films of Examples 1 to 3 in the Experiment of the Formation Si Oxide Deposition Film.
Figure 3:
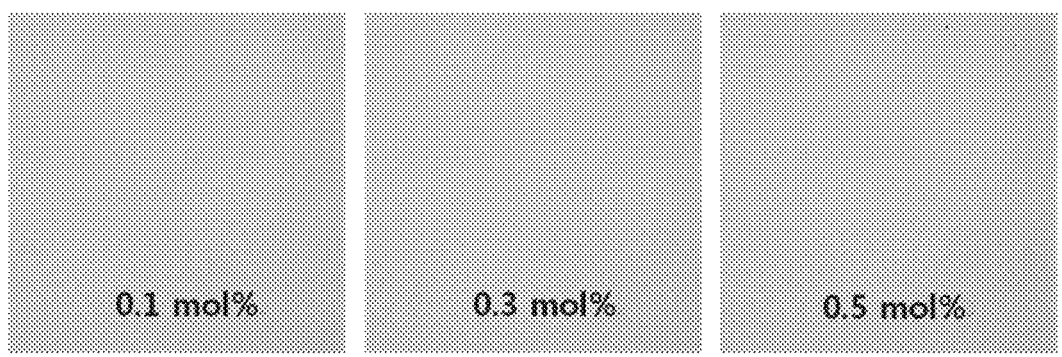
FIG. 3 shows scanning electron microscope (SEM) images of the silicon oxide deposition films formed on the films of Examples 4 to 6 in the Experiment of the Formation Si Oxide Deposition Film.

FIGS. 2 and 3 show SEM images of the obtained deposition films. In FIG. 2, the upper three images show the SiN deposition films formed on Film 1, Film 2, and Film 3, respectively, and the lower three images show the SiN deposition films formed on the films of Examples 1 to 3, respectively Referring to the result of FIG. 2, the films of Examples 1 to 3 respectively include the SiN deposition film on the surface without a surface wrinkle. By contrast, in case of Film 1, Film 2, and Film 3, the SiN deposition film on the surface include lot of wrinkles. Referring to the results of FIG. 3, the films of Examples 4 to 6 respectively include the SiN deposition film on the surface without a surface wrinkle.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

15. The film of claim 1, wherein the polyimide-polybenzoxazole copolymer comprises repeating units represented by
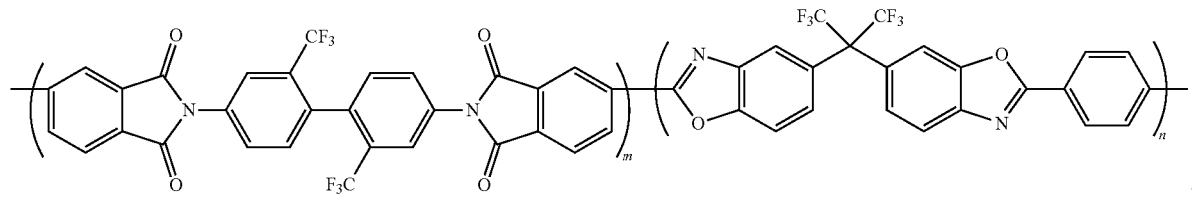

What is claimed is:

1. A film comprising a polyimide-polybenzoxazole copolymer comprising a repeating unit represented by Chemical Formula 1:

Chemical Formula 1

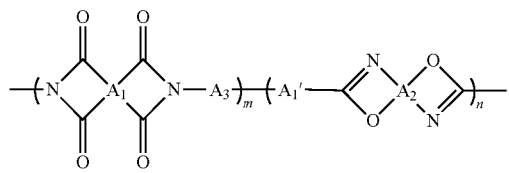

wherein in Chemical Formula 1, $A_1$ is a substituted or unsubstituted tetravalent C6 to C24 aliphatic ring group, a substituted or unsubstituted tetravalent C6 to C24 aromatic ring group, or a substituted or unsubstituted tetravalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, $A_1'$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, $A_2$ is a substituted or unsubstituted tetravalent C6 to C30 aromatic organic group, $A_3$ is a substituted or unsubstituted divalent C6 to C24 aliphatic ring group, a substituted or unsubstituted divalent C6 to C24 aromatic ring group, or a substituted or unsubstituted divalent C4 to C24 hetero aromatic ring group, wherein in the aliphatic ring group, the aromatic ring group, or the hetero aromatic ring group the ring is present alone; two or more rings are fused to each other to provide a condensed ring system; or two or more rings are linked through a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, and m and n are real numbers indicating a mole ratio of an imide repeating unit and a benzoxazole repeating unit, provided that a ratio of n to m is greater than or equal to 0.001 and less than or equal to 0.005.

2. The film of claim 1, wherein $A_1$ is selected from chemical formulae:

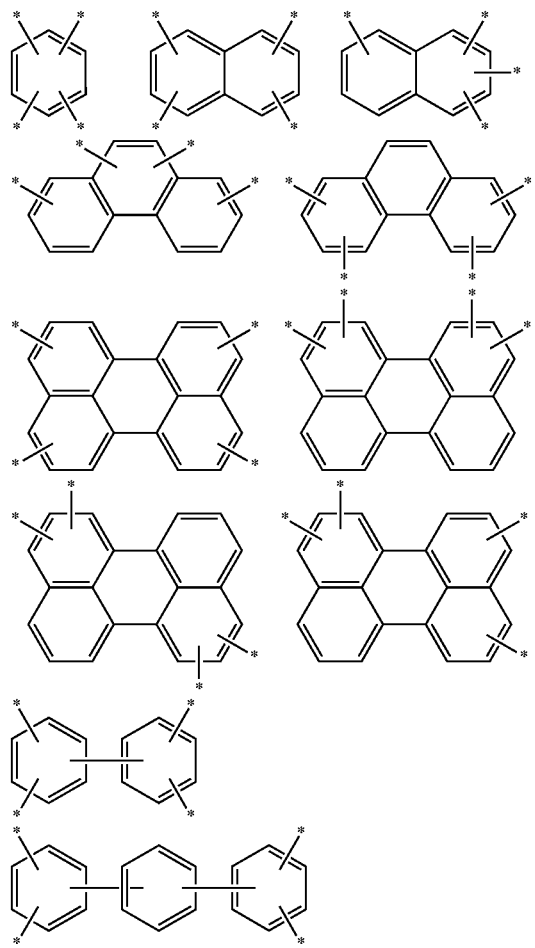

-continued

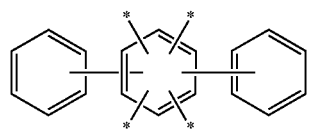

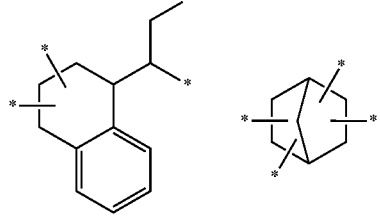

wherein in the chemical formulae, each residual group is substituted or unsubstituted, each L is the same as or different from each other, and is independently a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, $Z^1$ and $Z^2$ are the same or different and are independently —N= or —C(R$^{100}$)= wherein R$^{100}$ is hydrogen or a C1 to C5 alkyl group, provided that $Z^1$ and $Z^2$ are not simultaneously —C(R$^{100}$)=, $Z^3$ is —O—, —S—, or —NR$^{101}$—, wherein R$^{101}$ is hydrogen or a C1 to C5 alkyl group, and

* is a point where the residual group is linked to a neighboring atom.

3. The film of claim 2, wherein A$_1$ is selected from chemical formulae:

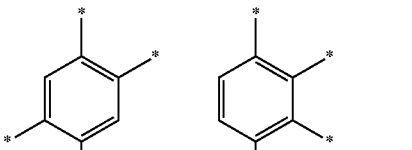

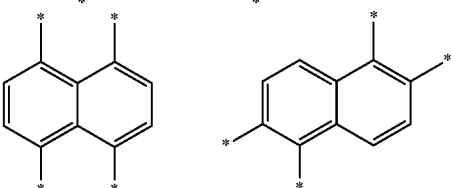

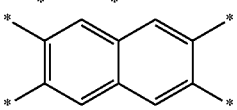

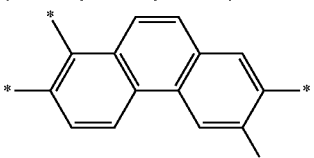

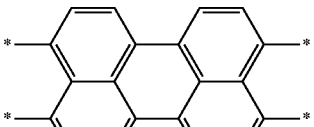

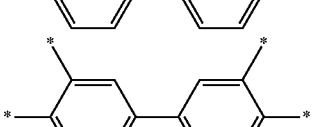

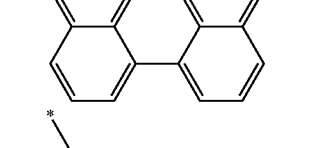

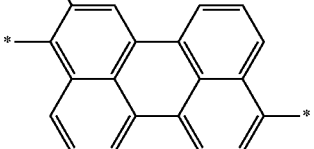

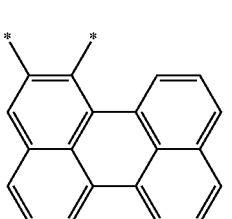

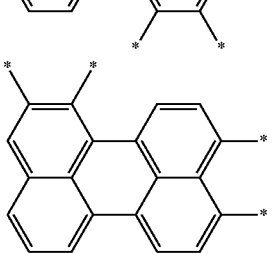

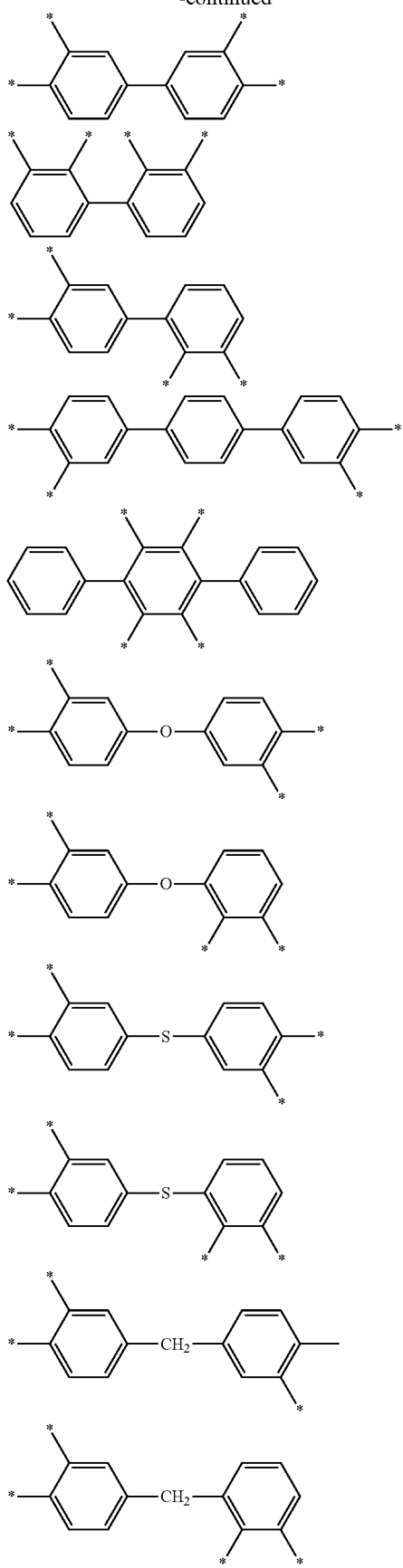
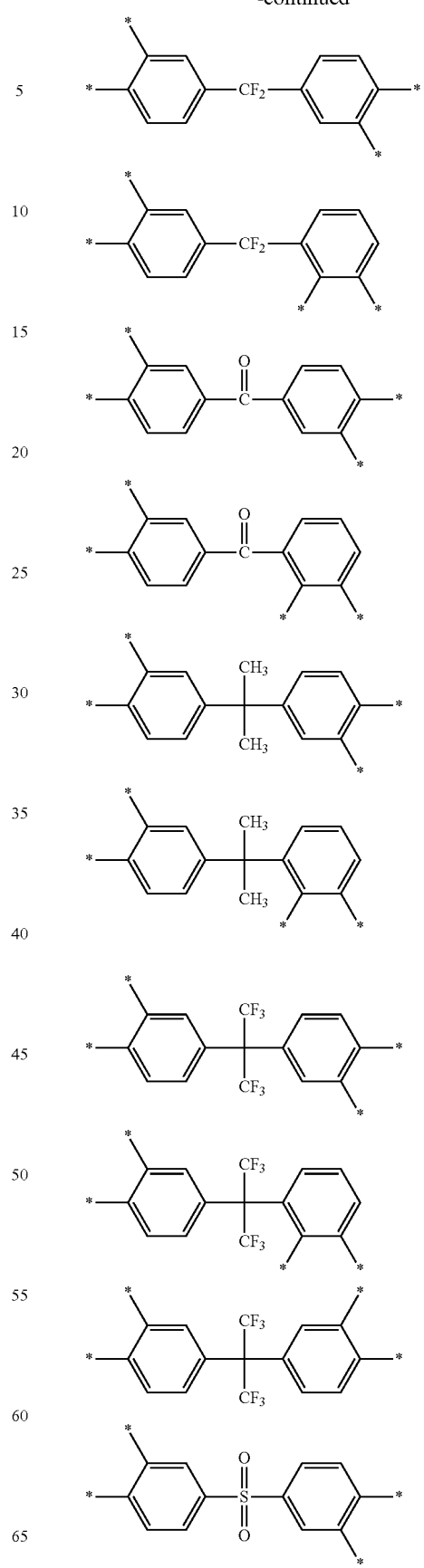

-continued

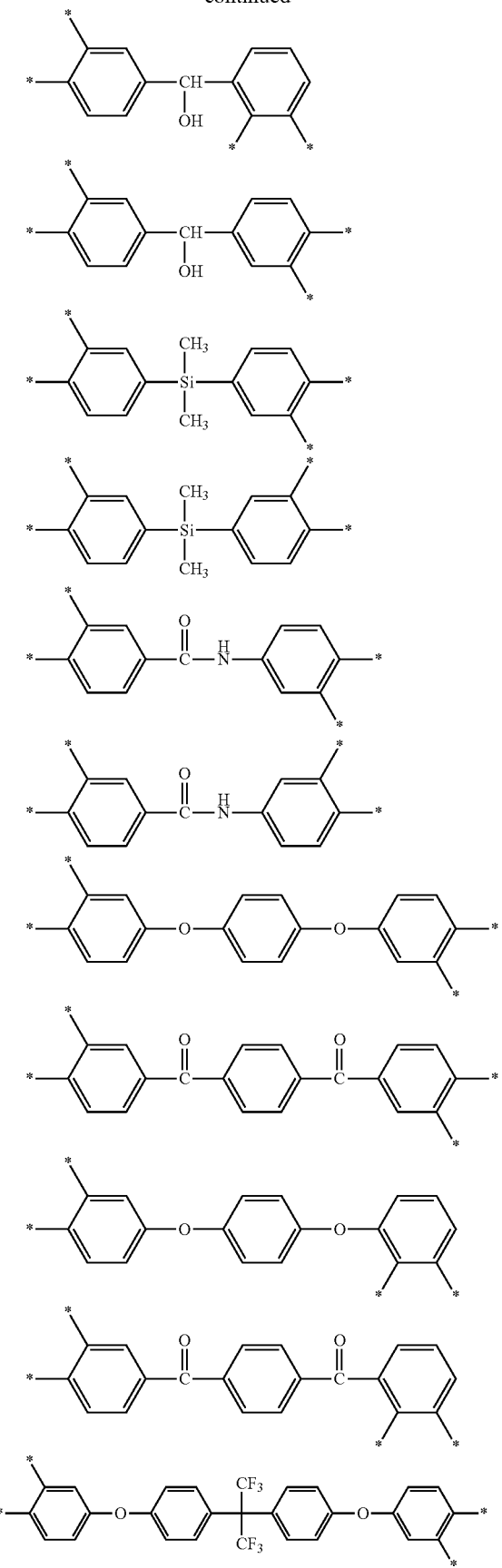

-continued

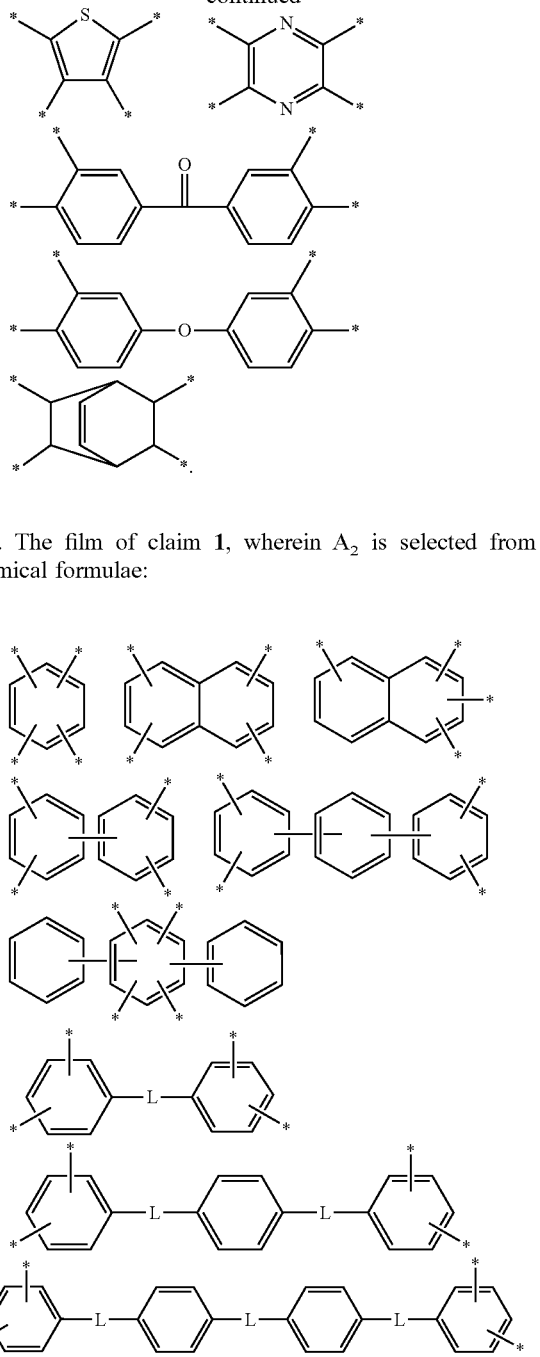

4. The film of claim 1, wherein $A_2$ is selected from chemical formulae:

wherein in the chemical formulae, each residual aromatic group is substituted or unsubstituted,

* is a point where the residual group is linked to a neighboring atom, and each L is the same or different from each other, and is independently a direct bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, and * is a point where they are linked to nitrogen or oxygen.
5. The film of claim 4, wherein A$_2$ is selected from chemical formulae:
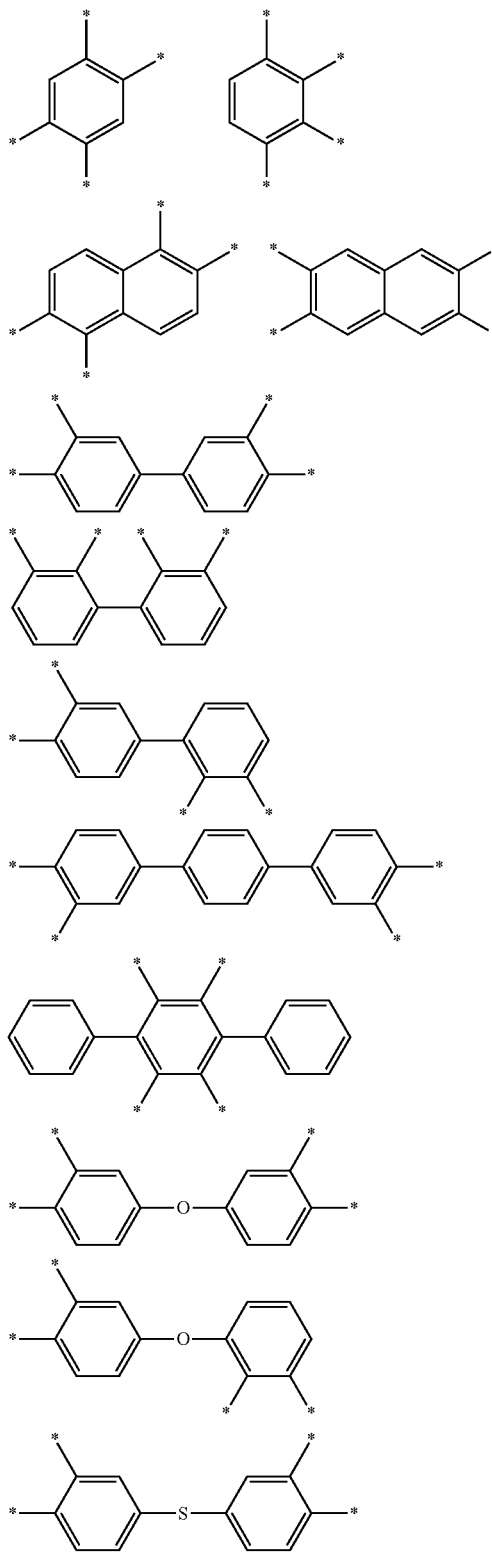
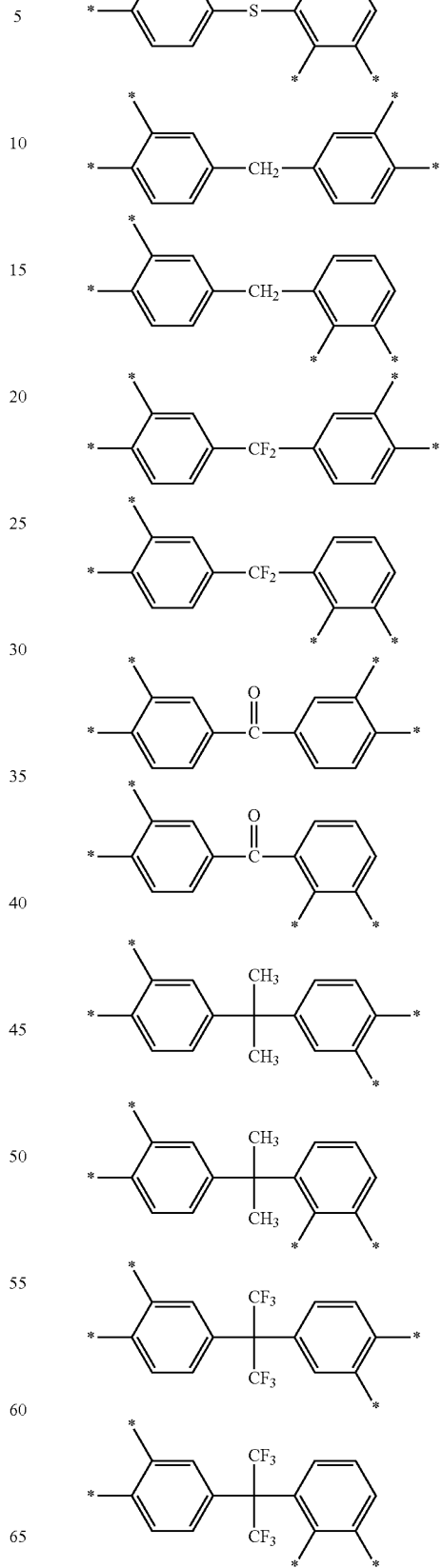

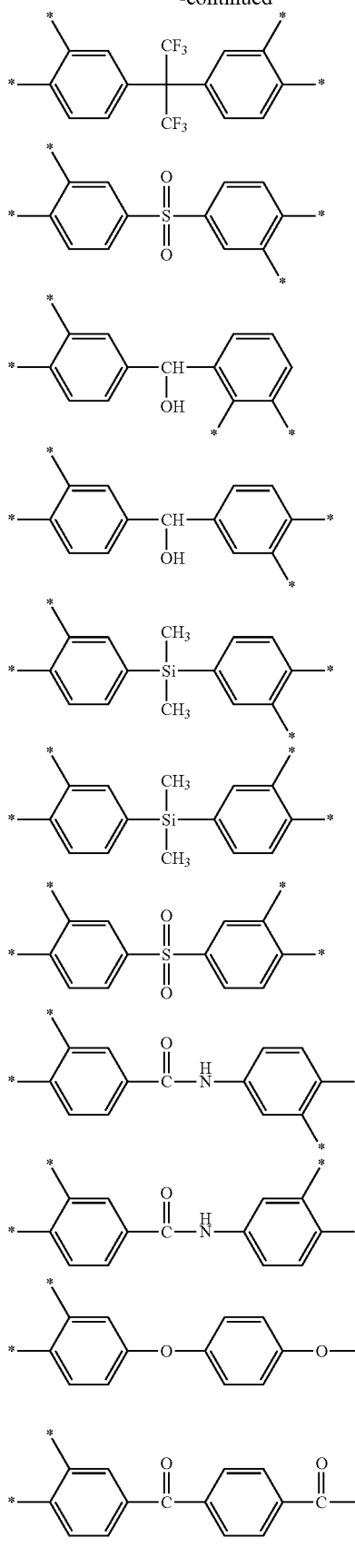

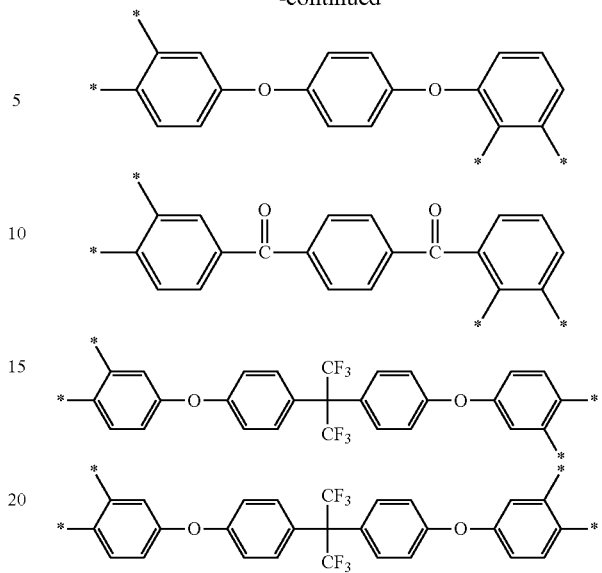

6. The film of claim 1, wherein $A_3$ is selected from chemical formulae:

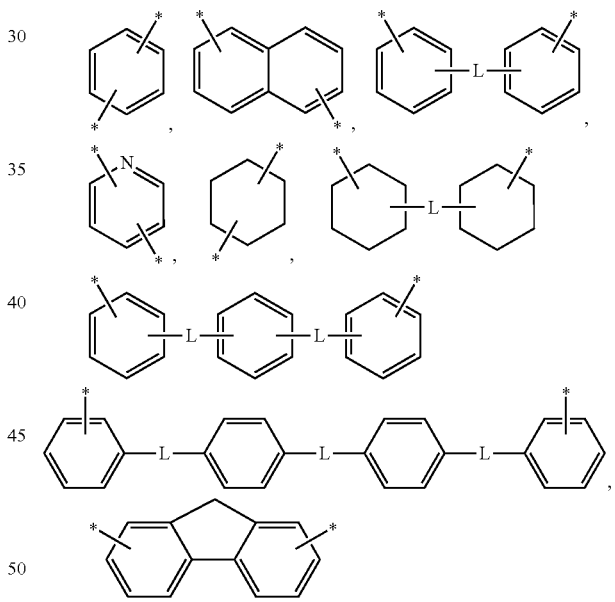

wherein in the chemical formulae, each residual group is substituted or unsubstituted, each L is the same as or different from each other, and is independently a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, and

* is a point where the residual group is linked to a neighboring atom.

7. The film of claim 6, wherein $A_3$ is selected from chemical formulae:
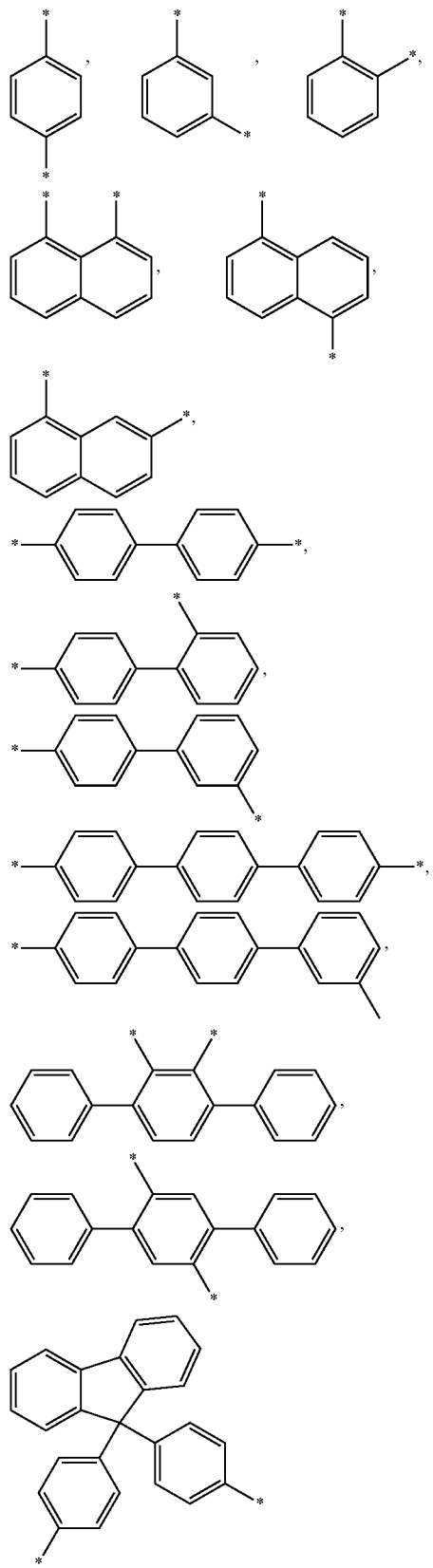
-continued
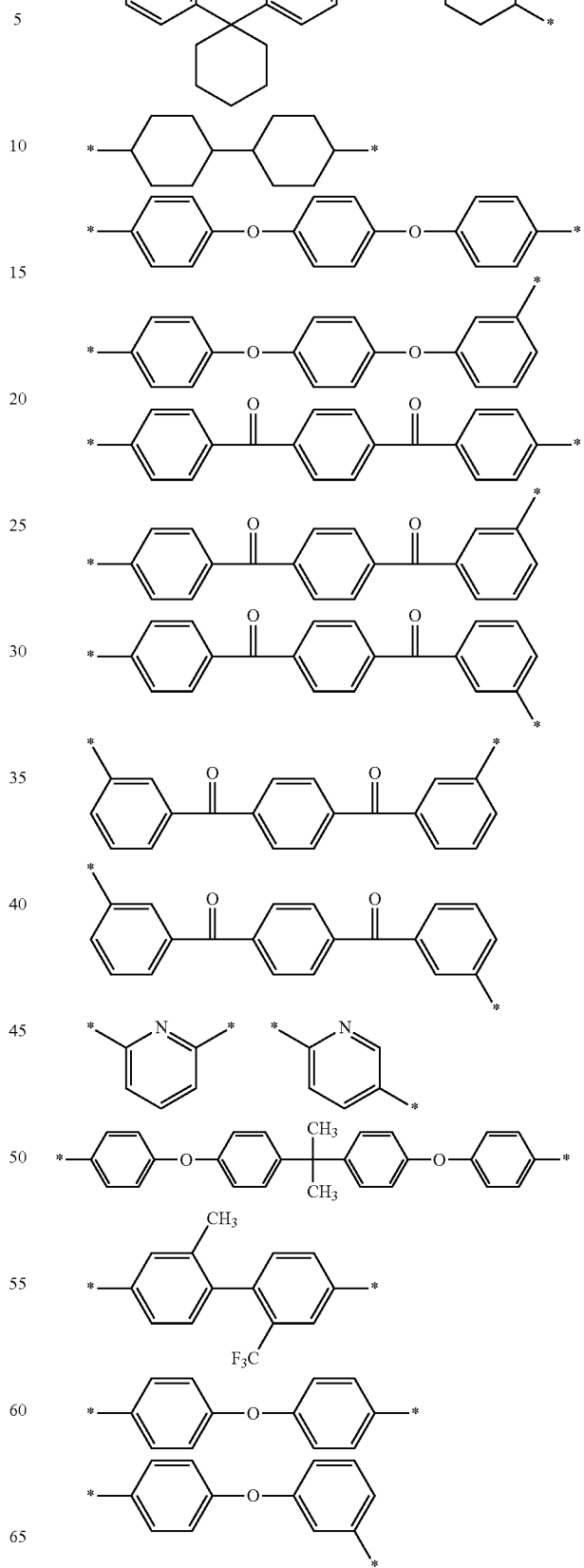

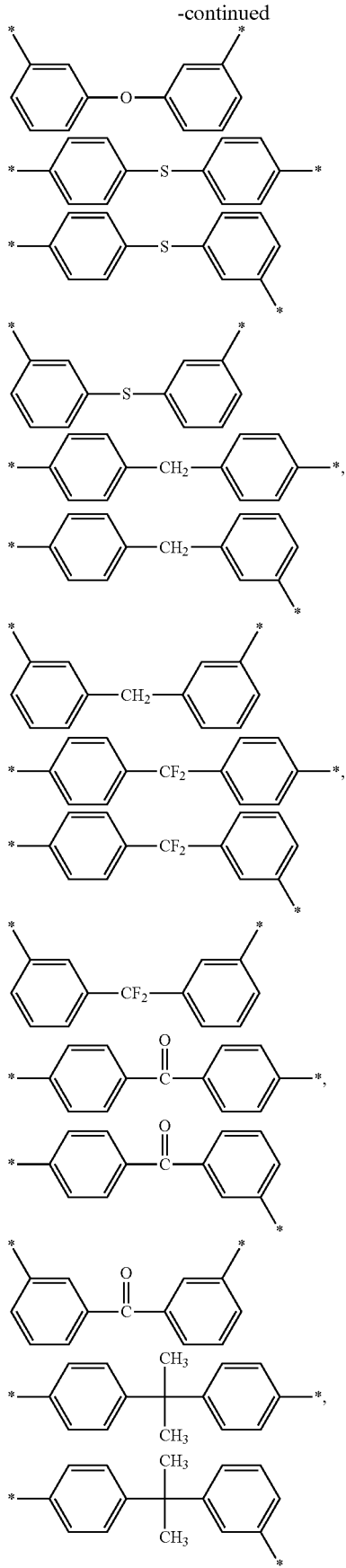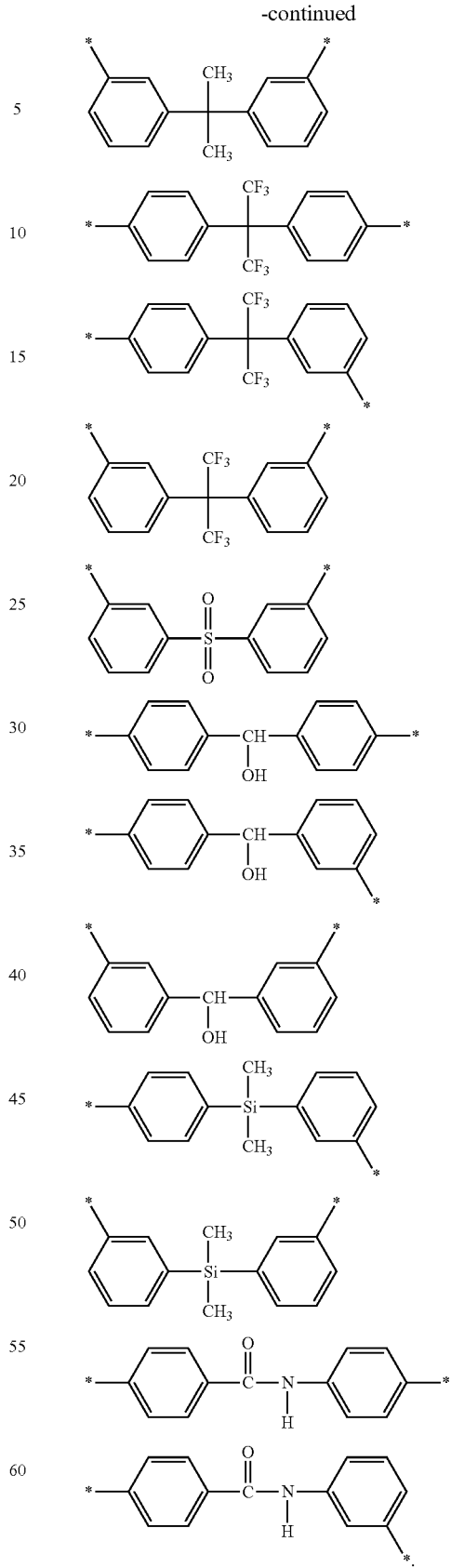

8. The film of claim 1, wherein $A_1'$ is selected from chemical formulae:

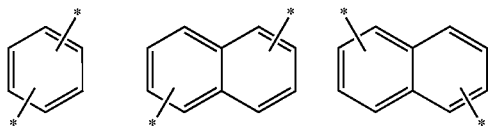
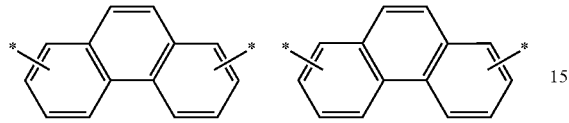
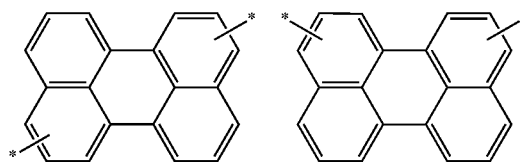
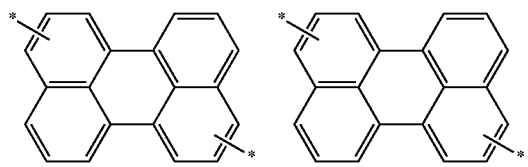
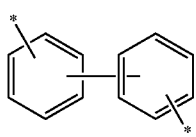
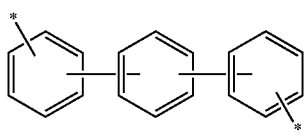
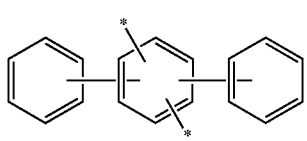
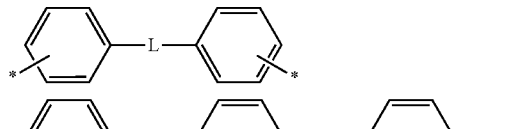
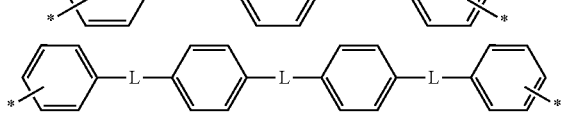

-continued

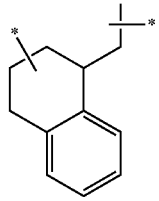
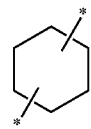

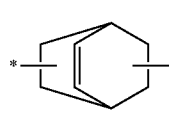
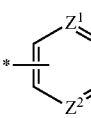
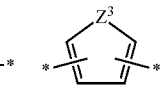

wherein in the chemical formulae, each residual group is substituted or unsubstituted, each L is the same as or different from each other, and is independently a single bond, —O—, —S—, —C(=O)—, —CH(OH)—, —S(=O)$_2$—, —Si(CH$_3$)$_2$—, (CH$_2$)$_p$ wherein 1≤p≤10, (CF$_2$)$_q$ wherein 1≤q≤10, —CR$_2$— wherein R is independently hydrogen, a C1 to C10 aliphatic hydrocarbon group, a C6 to C20 aromatic hydrocarbon group, or a C6 to C20 alicyclic hydrocarbon group, —C(CF$_3$)$_2$—, —C(CF$_3$)(C$_6$H$_5$)—, or —C(=O)NH—, $Z^1$ and $Z^2$ are the same or different and are independently —N= or —C(R$^{100}$)= wherein R$^{100}$ is hydrogen or a C1 to C5 alkyl group, provided that $Z^1$ and $Z^2$ are not simultaneously —C(R$^{100}$)=, $Z^3$ is —O—, —S—, or —NR$^{101}$—, wherein R$^{101}$ is hydrogen or a C1 to C5 alkyl group, and \* is a point where the residual group is linked to a neighboring atom.

9. The film of claim 1, wherein the film has transmittance of greater than or equal to about 85% for light in a wavelength of about 300 nanometers to about 800 nanometers.

10. The film of claim 1, wherein the film has a yellow index of less than or equal to about 5.2.

11. The film of claim 1, wherein the film has a coefficient of thermal expansion of less than or equal to about 12 parts per million/° C. at a temperature of about 50 to about 300° C.

12. An electronic device comprising:

a substrate;

the film of claim 1 disposed on the substrate; and a deposition film disposed on the film, wherein the deposition film comprises a silicon oxide, a polysilicic acid, an alkali metal silicate, an alkaline-earth metal silicate, an aluminosilicate, a silicon nitride, a silicon oxynitride, a silicon carbide, a silicon aluminaoxynitride, or a combination thereof.

13. An electronic device comprising the film of claim 1.

14. The electronic device of claim 13, wherein the electronic device is a flat panel display, a touch panel, a solar cell, an e-window, a heat mirror, a transparent transistor, a flexible display, a complementary metal oxide film semiconductor sensor, or a light emitting diode light.